(12) United States Patent
Sone

(10) Patent No.: US 10,558,401 B2
(45) Date of Patent: Feb. 11, 2020

(54) COMPUTER-READABLE MEDIUM HAVING PROGRAM FOR PORTABLE TERMINAL OR INFORMATION PROCESSING APPARATUS CONFIGURED TO GROUP DEVICES AND PERFORM SETTING THEREOF, AND PORTABLE TERMINAL AND INFORMATION PROCESSING APPARATUS FOR SAME

(71) Applicant: Brother Kogyo Kabushiki Kaisha, Nagoya-shi, Aichi-ken (JP)

(72) Inventor: Tatsuhiko Sone, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/143,571

(22) Filed: Sep. 27, 2018

(65) Prior Publication Data

US 2019/0095140 A1    Mar. 28, 2019

(30) Foreign Application Priority Data

Sep. 28, 2017 (JP) .................................. 2017-189234

(51) Int. Cl.
*G06F 3/12* (2006.01)
*H04W 76/11* (2018.01)

(52) U.S. Cl.
CPC .......... *G06F 3/1204* (2013.01); *G06F 3/1236* (2013.01); *G06F 3/1292* (2013.01); *G06F 3/1294* (2013.01); *H04W 76/11* (2018.02)

(58) Field of Classification Search
None
See application file for complete search history.

(56) References Cited

U.S. PATENT DOCUMENTS

| 8,818,210 | B2 | 8/2014 | Onishi | |
|---|---|---|---|---|
| 9,467,588 | B2 * | 10/2016 | Hashimoto | .......... H04N 1/0097 |
| 10,158,783 | B2 * | 12/2018 | Cho | ........................ G06F 15/16 |
| 2003/0030842 | A1 * | 2/2003 | Suyehira | ............ G03G 15/5079 |
| | | | | 358/1.15 |

(Continued)

FOREIGN PATENT DOCUMENTS

JP    2011-107892 A    6/2011

*Primary Examiner* — Thomas D Lee
(74) *Attorney, Agent, or Firm* — Banner & Witcoff, Ltd.

(57) ABSTRACT

A portable terminal has a memory having a program stored thereon and readably by a computer. The program causes the portable terminal to perform acquiring group ID and setting information, storing the group ID and the setting information in association with each other, receiving first instruction information for instructing execution of association processing for the stored group ID, acquiring device ID to identify the device, to which the portable terminal is brought close, from the device through the data acquisition interface, executing the association processing of associating the stored group ID and the device ID acquired through the data acquisition interface after receiving the first instruction information and acquiring the device ID through the data acquisition interface, and storing the association, and after executing the association processing, transmitting the setting information associated with the group ID to the device associated with the group ID, through the network interface.

15 Claims, 18 Drawing Sheets

(56) References Cited

U.S. PATENT DOCUMENTS

| | | | |
|---|---|---|---|
| 2003/0063305 A1* | 4/2003 | McIntyre | G06K 15/00 |
| | | | 358/1.13 |
| 2008/0079975 A1* | 4/2008 | Ferlitsch | H04L 67/16 |
| | | | 358/1.13 |
| 2011/0116129 A1 | 5/2011 | Onishi | |
| 2014/0240739 A1* | 8/2014 | Hattori | G06F 3/1219 |
| | | | 358/1.13 |
| 2017/0150003 A1* | 5/2017 | Odagiri | H04N 1/00244 |

* cited by examiner

FIG. 8

DEVICE LIST

| | DEVICE ID | | | DEVICE INFORMATION | | | |
|---|---|---|---|---|---|---|---|
| | IP ADDRESS | MAC ADDRESS | MODEL NAME | SIZE | COLOR | SCAN | |
| 1 | 192.168.0.101 | 74:72:F2:0E:D8:05 | MFP-A | A4 | MONOCHROME | POSSIBLE | .... |
| 2 | 192.168.0.102 | 74:72:F2:0C:D8:15 | MFP-B | A4/A3 | MONOCHROME/ COLOR | POSSIBLE | .... |
| 3 | 192.168.0.103 | 74:72:F2:0E:D8:25 | MFP-A | A4 | MONOCHROME | POSSIBLE | .... |
| 4 | 192.168.0.104 | 74:72:F2:1D:D8:35 | MFP-C | A4 | MONOCHROME | IMPOSSIBLE | .... |
| 5 | 192.168.0.105 | 74:72:F2:0E:D8:45 | MFP-A | A4 | MONOCHROME | POSSIBLE | .... |
| ... | ... | ... | ... | ... | ... | ... | ... |

FIG. 14

SETTING LIST

| GROUP NAME | DEVICE ID | | SETTING INFORMATION | | | |
|---|---|---|---|---|---|---|
| | | IP ADDRESS | MAC ADDRESS | SIZE | COLOR | SHEET TYPE | SHEET-NUMBER LIMITING |

| GROUP NAME | | IP ADDRESS | MAC ADDRESS | SIZE | COLOR | SHEET TYPE | SHEET-NUMBER LIMITING |
|---|---|---|---|---|---|---|---|
| GENERAL AFFAIRS | 1 | 192.168.0.101 | 74:72:F2:0E:D8:05 | A4 | MONOCHROME | NORMAL SHEET | 100 SHEETS/DAY |
| | 2 | 192.168.0.102 | 74:72:F2:0C:D8:15 | | | | |
| | 3 | 192.168.0.103 | 74:72:F2:0E:D8:65 | | | | |
| PLANNING | 1 | | | A4 | COLOR | NORMAL SHEET | 50 SHEETS/DAY |
| | 2 | | | | | | |
| DEVELOPMENT | 1 | | | A4 | MONOCHROME | NORMAL SHEET | 200 SHEETS/DAY |
| | 2 | | | | | | |
| | 3 | | | | | | |
| | 4 | | | | | | |
| ... | | | | | | | |

FIG. 15

MANAGEMENT LIST

| GENERAL AFFAIRS | ACCOUNTING | DEVELOPMENT | JUDICIAL AFFAIRS | SALES | INTELLECTUAL PROPERTY | GUARANTEE OF QUALITY | PLANNING |

NUMBER OF REGISTERED DEVICES: 3 DEVICES

| | MODEL NAME | IP ADDRESS | MAC ADDRESS |
|---|---|---|---|
| 1 | MFP-A | 192.168.0.101 | 74:72:F2:0E:D8:05 |
| 2 | MFP-B | 192.168.0.102 | 74:72:F2:0E:D8:05 |
| 3 | MFP-C | 192.168.0.103 | 74:72:F2:0E:D8:05 |

PRINTING SETTING
SIZE: A4
COLOR: MONOCHROME
LIMITED NUMBER OF SHEETS: 100 SHEETS/DAY

DEVICE INFORMATION
SIZE: A4/A3
COLOR: COLOR/MONOCHROME
SHEET TYPE: NORMAL SHEET
SCAN: POSSIBLE

COMPUTER-READABLE MEDIUM HAVING PROGRAM FOR PORTABLE TERMINAL OR INFORMATION PROCESSING APPARATUS CONFIGURED TO GROUP DEVICES AND PERFORM SETTING THEREOF, AND PORTABLE TERMINAL AND INFORMATION PROCESSING APPARATUS FOR SAME

CROSS-REFERENCE TO RELATED APPLICATION

This application claims priority from Japanese Patent Application No. 2017-189234 filed on Sep. 28, 2017, the entire subject-matter of which is incorporated herein by reference.

TECHNICAL FIELD

The present disclosure relates to a non-transitory computer-readable medium having a program used for a portable terminal or an information processing apparatus configured to group a plurality of devices such as a printer or a complex machine and to perform a setting for the same.

BACKGROUND

In offices and the like, an information processing apparatus such as a personal computer and a plurality of devices such as a printer, a complex machine and the like may be used with being connected to a local network.

A user performs an initial setting of the device by operating the information processing apparatus or the device. The initial setting relates to a size of a sheet to be printed, a color to be used for printing such as color and monochrome, and the like. After performing the initial setting, the user instructs each device to execute printing by using the information processing apparatus.

In the case that the user instructs each device to execute printing by using the information processing apparatus, when there are many devices, it is difficult to identify each device by a MAC address, an IP address and a device name allotted to each device. When there are many devices, it takes time to perform the initial setting.

There has been disclosed a technology by which the user can easily identify each device and can easily perform the initial setting. Specifically, a printer is configured to notify a computer of information indicating whether a cover is opened. The computer is configured to give the printer of which the cover is opened with a registration name and to perform the initial setting. That is, according to the technology, it is possible to integrate the plurality of devices into one group, to give the same with the registration name and to integrally perform the initial setting.

SUMMARY

According to the technology described above, when performing the initial setting for one group and then performing the initial setting for the other group, it takes time because the user should close the cover of the printer for which the initial setting has been performed, open a cover of a printer for which the initial setting will be performed, and again return to the computer.

According to the technology described above, for example, for a time period after the user opens or closes the cover of the printer until the user returns to the computer, if a person other than the user who performs the initial setting erroneously opens or closes the cover, a registration name is given to an unintended printer or a registration name is not given to an intended printer.

The specification discloses a non-transitory computer-readable medium having a program that enables to reduce concern about an error of registration and time necessary for setting, a portable terminal having a computer that executing the program, an information processing apparatus having a computer that executing the program, and an information processing system having the portable terminal and the information processing apparatus.

One illustrative aspect provides a non-transitory computer-readable recording medium storing computer-readable instructions for a portable terminal having a network interface, a data acquisition interface configured to be capable of acquiring data from a device as the portable terminal comes close to the device, and a memory, the computer-readable instructions, when executed by a processor of the portable terminal, causing the portable terminal to perform:

acquiring group ID and setting information;

storing the acquired group ID and the acquired setting information in the memory in association with each other;

executing the association processing of associating the group ID stored in the memory and the device ID acquired through the data acquisition interface, after receiving first instruction information and acquiring device ID, the first instruction information being for instructing execution of the association processing for the group ID stored in the memory, the device ID being acquired from the device through the data acquisition interface, and the device ID being information for identifying the device to which the portable terminal comes close;

storing the associated information in the memory; and after executing the association processing, transmitting the setting information associated with the group ID to the device associated with the group ID, through the network interface.

The aspect provides a portable terminal having:

a network interface;

a data acquisition interface configured to be capable of acquiring data from a device as the portable terminal comes close to the device;

a memory; and a controller configured to:

acquiring group ID and setting information;

storing the acquired group ID and the acquired setting information in the memory in association with each other;

executing association processing of associating the group ID stored in the memory and device ID acquired through the data acquisition interface, after receiving the instruction information and acquiring the device ID through the data acquisition interface, the instruction information being for instructing execution of the association processing for the group ID stored in the memory, the device ID being acquired from the device through the data acquisition interface, and the device ID being information for identifying the device to which the portable terminal comes close;

storing the associated information in the memory; and after executing the association processing, transmitting the setting information associated with the group ID to the device associated with the group ID, through the network interface.

According to the above configuration of the non-transitory computer-readable medium and the portable terminal, when the group ID and the setting information are directly or indirectly input to the computer by a user, the computer stores the input group ID and setting information in the memory in association with each other. In the meantime, "direct" means that the user inputs the group ID and the setting information to the portable terminal by using an input unit such as a touch panel or the like of the computer, and "indirect" means that the group ID and the setting information are transmitted and input to the portable terminal from a personal computer, a server or the like. When the user brings the portable terminal close to the device, the data acquisition interface of the portable terminal acquires the device ID from the approached device. The data acquisition interface is configured to acquire the device ID by performing near field communication with the device, by capturing an image such as a QR code (registered trademark) of the device, or the like. That is, the data acquisition interface is a near field communication module, camera or the like. The computer is configured to store the acquired device ID and the group information and setting information in the memory in association with each other, in accordance with the first instruction information received from the user (hereinafter, referred to as 'registration of device'). The computer is configured to transmit the setting information associated with the device ID to the device indicated by the acquired device ID through the network interface. In the meantime, the device having received the setting information is configured to store the received setting information in the device memory thereof. The setting information is a printing setting, for example.

The aspect provides a non-transitory computer-readable recording medium storing computer-readable instructions for an information processing apparatus having a network interface and a memory, the computer-readable instructions, when executed by a processor of the information processing apparatus, causing the information processing apparatus to perform:

acquiring group ID and setting information;

storing the acquired group ID and the acquired setting information in the memory in association with each other;

transmitting the group ID to a portable terminal through the network interface, the portable terminal having a data acquisition interface configured to be capable of acquiring device ID from a device identified with the device ID as the portable terminal comes close to the device;

receiving the device ID from the portable terminal that is a transmission destination of the transmitted group ID, through the network interface;

associating the received device ID, the group ID transmitted to the portable terminal that is a transmission source of the device ID and the setting information, and storing the association in the memory; and transmitting the setting information associated with the device ID to the device indicated by the device ID.

The aspect provides an information processing apparatus having:

a network interface;

a memory; and a controller configured to:

acquiring group ID and setting information;

storing the acquired group ID and the acquired setting information in the memory in association with each other;

transmitting the group ID and the setting information associated with each other to a portable terminal through the network interface;

receiving the group ID, the setting information and device ID associated with each other by the portable terminal, from the portable terminal through the network interface; and transmitting the setting information associated with the device ID to a device indicated by the received device ID.

According to the above configuration of the non-transitory computer-readable medium and the information processing apparatus, when the computer of the information processing apparatus acquires the group ID and the setting information, the computer stores the acquired group ID and setting information in the memory in association with each other and transmits the group ID to the portable terminal. The portable terminal is configured to acquire the device ID from the device approached by the user and to associate the acquired device ID and the group ID input from the information processing apparatus. The portable terminal is configured to transmit the device ID and group ID associated with each other to the information processing apparatus. The computer of the information processing apparatus having received the device ID and group ID associated with each other is configured to store the group ID, the device ID and the setting information in the memory in association with each other. The computer of the information processing apparatus is configured to transmit the setting information associated with the device ID to the device indicated by the received device ID through the network interface. The device having received the setting information is configured to store the received setting information in the device memory thereof. The setting information is a printing setting, for example. Since the user performs the registration of device with bringing the portable terminal close to the device, it is possible to reduce the time necessary for the registration of device, as compared to the configuration of the related art where the user should return to a place at which a server or a personal computer is equipped whenever the registration of one group is completed. When performing the registration of device, a behavior of a person other than a person who performs the registration does not have an influence on success or failure of the registration. Accordingly, concern about an error of the registration is reduced.

The aspect provides an information processing system having:

an information processing apparatus including a network interface, a memory, a display and a controller; and an IC card including a near-field interface configured to perform near field communication with a device, wherein the IC card performs near field communication with the device to transmit a command for transmitting a device ID of the device to the information processing apparatus, to the device, and wherein the controller is configured to:

acquiring group ID and setting information;

storing the acquired group ID and the acquired setting information in the memory in association with each other;

receiving instruction information for instructing execution of association processing for the group ID stored in the memory;

receiving the device ID transmitted from the device receiving the command from the IC card, through the network interface;

after receiving the instruction information and receiving the device ID through the network interface, executing the association processing of associating the group ID stored in the memory and the device ID received through the network interface, and storing the association in the memory; and after executing the association processing, transmitting the setting information associated with the group ID to the device associated with the group ID, through the network interface.

According to the above configuration of the information processing system, when the computer of the information processing apparatus acquires the group ID and the setting information, the computer stores the acquired group ID and setting information in the memory in association with each other. The setting information is a printing setting, for example. When the IC card is brought close to the device by the user, the device transmits the device ID to the information processing apparatus. The computer of the information processing apparatus receives the device ID through the network interface, and stores the received device ID in the memory in association with the group ID and setting information, in accordance with the instruction information. The computer of the information processing apparatus is configured to transmit the setting information associated with the device ID to the device indicated by the received device ID through the network interface. The device having received the setting information is configured to store the received setting information in the device memory thereof. The setting information is a printing setting, for example. Since the user performs the registration of device with bringing the IC card close to the device, when performing the registration of device, a behavior of a person other than a person who performs the registration does not have an influence on success or failure of the registration. Accordingly, the concern about an error of the registration is reduced.

BRIEF DESCRIPTION OF DRAWINGS

FIG. 8 depicts a device list.

FIG. 14 depicts a setting list.

FIG. 15 depicts a management screen.

DETAILED DESCRIPTION

Hereinafter, an illustrative embodiment of the present disclosure will be described with reference to the drawings. In the meantime, the illustrative embodiment to be described later is just an example of the present disclosure, and the illustrative embodiment of the present disclosure can be appropriately changed without changing the gist of the present disclosure. For example, an execution sequence of each processing to be described later can be appropriately changed without changing the gist of the present disclosure.

Figure 1:
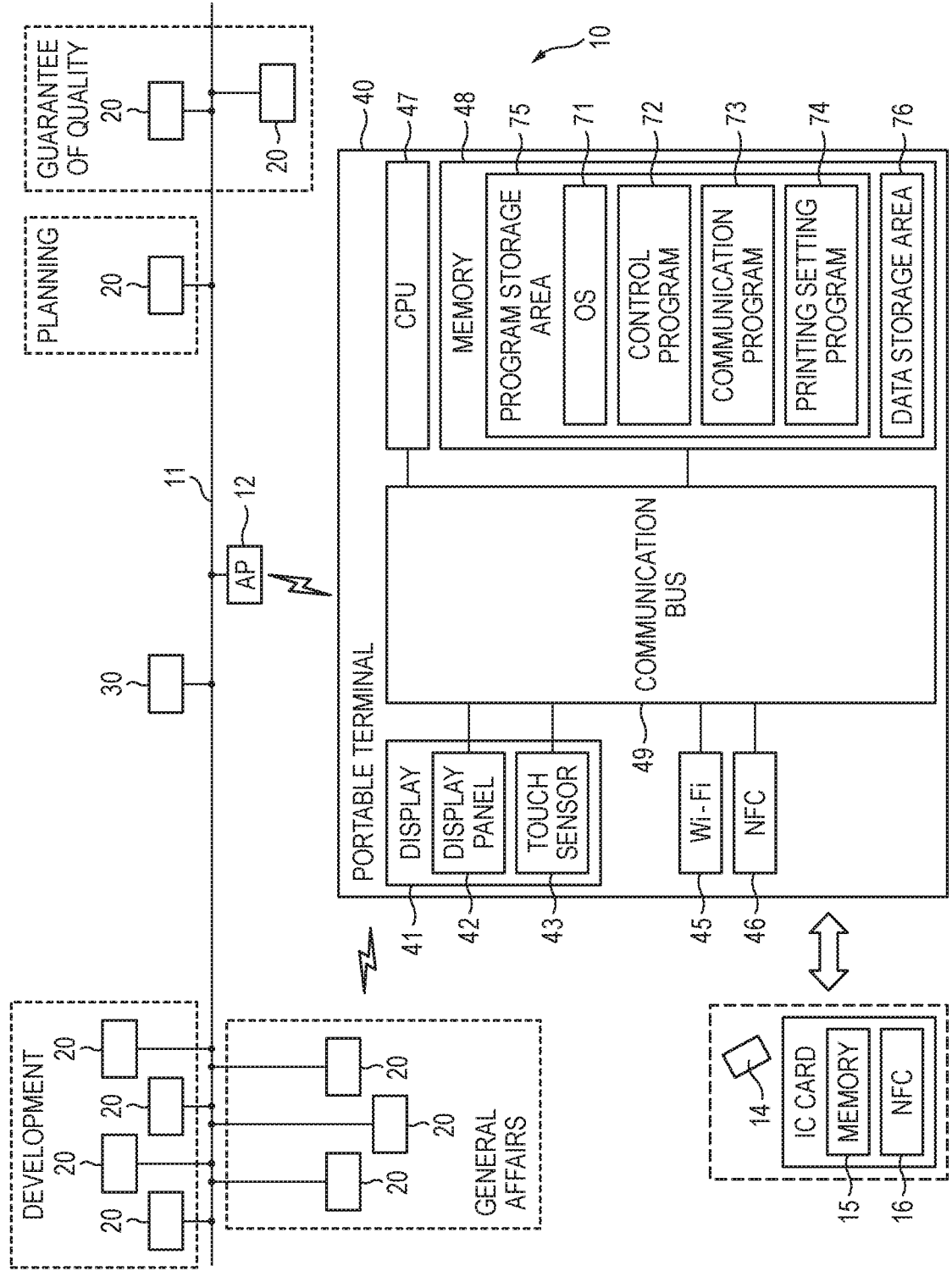
FIG. 1 depicts an outline of a system in accordance with an illustrative embodiment.

FIG. 1 is a schematic view of a system 10 in accordance with an illustrative embodiment. The system 10 shown in FIG. 1 includes a plurality of MFPs 20, an information processing apparatus 30, a portable terminal 40, and a communication network 11. The MFP 20 is an example of the device. In FIG. 1, an IC card 14 is not a configuration of the illustrative embodiment but a configuration of the system 10 that is to be described in a second modified embodiment. The IC card 14 will be described in the second modified embodiment.

The plurality of MFPs 20 and the information processing apparatus 30 are connected to the communication network 11 in a wired or wireless method. The information processing apparatus 30 is a personal computer, a management server or the like.

An information processing terminal (not shown) such as a personal computer or the like is connected to the communication network 11. A user inputs an instruction of scan, copy, printing and the like to the MFP 20 through the information processing terminal.

The communication network 11 is a LAN, for example. The LAN may be a wired LAN or a wireless LAN. The LAN may be a peer-to-peer type or a client server type in which the information processing apparatus 30 is a client server.

The communication network 11 may consist of a single network segment or a plurality of network segments.

On the communication network 11, communication is performed using a communication protocol corresponding to a type of the communication network 11. In the below, an example where the intranet is used as the communication network 11 will be described. That is, an example where the communication network 11 is a wired or wireless LAN and a TCP/IP is used as the communication protocol will be described. That is, the communication is performed using an IP address on the communication network 11. The IP address may be a global IP address or a private IP address. The MFP 20 has an MIB, which stands for Management Information Base described later, as management information in the TCP/IP. In the meantime, the communication network 11 is not limited to the intranet.

The portable terminal 40 is a smart phone or a tablet, for example, and is used to perform an initial setting for printing for the plurality of MFPs 20 connected to the communication network 11. The details will be described later.

[Portable Terminal 40]

The portable terminal 40 mainly includes a display 41, a Wi-Fi 45, an NFC 46, a CPU 47, a memory 48, and a communication bus 49.

The display 41 includes a display panel 42 configured to display a screen and a touch sensor 43 superimposed on the display panel 42. That is, the display 41 is a so-called touch panel. The touch sensor is an example of the input interface, and the display panel 42 is an example of the notification unit and the display. In the meantime, the portable terminal 40 may be provided with a button and the like to be pushed by the user, together with the touch sensor or instead of the touch sensor.

The display panel 42 is configured to display, on a screen, objects consisting of a character and a figure. The object includes a character string, an icon, a button, a link, a pull-down menu and the like displayed on the display 41, for example.

The touch sensor 43 is configured to output position information indicative of a position on the screen touched by the user. A control program 72 is configured to determine an object touched by the user from a position of an object displayed on the screen and the position information to be output from the touch sensor 43. That is, the user performs an input operation to the portable terminal 40 by touching the object. In the meantime, the "touch" includes all operations of bringing an input medium into contact with a display surface. Although the input medium is not in contact with the display surface, "hover" or "floating touch" of bringing the input medium close to a position at which a distance between the input medium and the display surface is very small may be included in the concept of the "touch." The input medium may be a user's finger, a touch pen or the like.

The Wi-Fi 45 is a communication module configured to perform wireless communication by using a communication standard of Wi-Fi. The Wi-Fi 45 can be connected to the communication network 11 through an access point 12 denoted as "AP" in FIG. 1. That is, the portable terminal 40 can perform communication with the information processing apparatus 30 connected to the communication network 11 by using the Wi-Fi 45. The Wi-Fi 45 is an example of the network interface. In the meantime, the portable terminal 40 may include a communication module capable of connecting to the communication network 11 by a communication standard other than the Wi-Fi, instead of the Wi-Fi 45. For example, the portable terminal 40 may include a communication module configured to perform communication by using a wired LAN, a communication module configured to perform communication by using a USB, or a communication module configured to perform communication by using Bluetooth (Trademark), instead of the Wi-Fi 45 or together with the Wi-Fi 45.

The NFC 46 is a communication module configured to perform near field communication by using a communication standard of NFC. The NFC 46 is configured to perform near field communication with the MFP 20 in a peer-to-peer mode. That is, the portable terminal 40 46 is configured to bi-directionally perform near field communication with the MFP 20. The NFC 46 is an example of the data acquisition interface. In the meantime, the portable terminal 40 may include a communication module capable of performing near field communication with the MFP 20 by a communication standard other than the NFC, instead of the NFC 46.

The CPU 47 is a central processing unit. The CPU 47 is configured to execute calculations in accordance with commands described in each program, which will be described later. That is, the program is executed in the CPU 47. The CPU 47 is an example of the computer.

The memory 48 is configured by a RAM, a ROM, an EEPROM, a portable storage medium such as an SD card, and the like.

The memory 48 may be a computer-readable storage medium. The computer-readable storage medium is a non-transitory medium. The non-transitory medium includes a recording medium such as a CD-ROM and a DVD-ROM as well as the above-described media. The non-transitory medium is a tangible medium. In the meantime, an electric signal for carrying a program to be downloaded from a server or the like on the Internet is a computer-readable storage medium, which is a kind of the computer-readable medium, but is not included in the non-transitory computer-readable storage medium.

The memory 48 has a program storage area 75 in which programs such as an OS 71, a control program 72, a communication program 73, a printing setting program 74 and the like are stored. The OS 71, the control program 72 and the communication program 73 stored in the program storage area 75 are executed in the CPU 47, which is a central processing unit. The CPU 47 and the memory 48 are an example of the controller.

The OS 71 is a program configured to control executions of the other programs such as the control program 72, the communication program 73, the printing setting program 74 and the like.

The control program 72 is a program configured to perform display control on the display 41, input control of receiving an input of the position information from the touch sensor 43, and the like.

The communication program 73 is a program configured to control communication with the above-described information processing terminal (not shown), the MFP 20 and the information processing apparatus 30.

As described later, the printing setting program 74 is a program configured to perform an initial setting of a printing setting of the MFP 20. The printing setting program 74 is downloaded through the Internet and is installed in the portable terminal 40, for example. Alternatively, a portable storage medium such as a micro SD card having the printing setting program 74 stored therein is connected to the portable terminal 40, so that the printing setting program 74 is installed in the portable terminal 40. The printing setting program 74 is an example of the program.

The memory 48 has a data storage area 76 in which data and information necessary to execute the control program 72 and the communication program 73 are stored. The data storage area 76 is a RAM, and EEPROM and the like. In the data storage area 76, an IP address allotted thereto and IP addresses of the information processing terminal (not shown), the MFP 20 and the information processing apparatus 30 are stored, for example. When the communication network 11 has a plurality of network segments, the data storage area 76 stores a MAC address of a router and the like. The router is a relay node in which a routing table is stored.

In the data storage area 76, setting information (printing setting) set by the printing setting program 74 is stored. The details will be described later.

[MFP 20]

The MFP 20 mainly includes a printer, a scanner, a display, a first communication I/F, an NFC communication module, a CPU, a memory, and a communication bus. The respective constitutional elements of the MFP 20 are connected to each other through the communication bus.

The printer is configured to print an image such as a character, a figure and the like on a sheet in accordance with the printing setting. The printing setting includes a sheet size of "A4", "B5", "letter-size" and the like, a sheet type of "normal sheet", "thick sheet" and the like, a color of "monochrome" and "color", and a printing surface of "one surface" and "both surfaces". The printing setting includes "Nin1" for aggregating a plurality of pages on one sheet.

The scanner is configured to read an image such as a character, a figure and the like printed on a sheet and to output the same as image information. The image read by the scanner is printed on a sheet by the printer, so that the copy is performed.

The configurations of the display, the NFC communication module, the CPU, and the communication bus are similar to those of the display 41, the NFC 46, the CPU 47 and the communication bus 49 of the portable terminal 40.

The first communication I/F is connected to the communication network 11 in a wired or wireless manner. The MFP 20 is configured to perform communication with the above-described information processing terminal, the information processing apparatus 30 and the portable terminal 40 through the first communication I/F.

The memory is configured by a RAM, a ROM, an EEPROM, an HDD, a portable storage medium such as a USB memory to be detachably mounted to the MFP 20, a buffer of the CPU or a combination thereof, for example.

The memory has a program storage area in which programs such as an OS, a control program, a communication program and the like are stored. The OS, the control program, and the communication program stored in the program storage area are executed in the CPU. The OS has a configuration similar to the OS 71 of the portable terminal 40.

The control program is a program configured to perform drive control of the printer and the scanner and display control of displaying an object on the display.

The communication program is a program configured to control communication with the above-described information processing terminal (not shown), the information processing apparatus 30 and the portable terminal 40.

The memory has a data storage area in which data and information necessary to execute the control program and the communication program are stored. In the data storage area, an IP address and a MAC address allotted thereto, and IP addresses of the information processing terminal (not shown), the information processing apparatus 30 and the portable terminal 40 are stored.

In the memory, an MIB is stored. The MIB is a model name such as "MFP-A", device information, and the like, for example. The device information is information indicative of functions that can be executed by the MFP 20, such as "only monochrome", "color/monochrome", "only one-side printing", "one-side printing/duplex printing", "only A4", "A4/B5/A3/letter", "scan possible", "scan impossible" and the like.

[Information Processing Apparatus 30]

The information processing apparatus 30 mainly includes an input I/F, an output I/F, a second communication I/F, a CPU, a memory, and a communication bus. The respective constitutional elements of the information processing apparatus 30 are connected each other through the communication bus. A PC or a workstation is an example of the information processing apparatus 30.

The input I/F is connected to an input device such as a keyboard and a mouse in a wired or wireless manner, and is configured to receive an input of an operation signal from the input device. The user performs an input operation to the information processing apparatus 30 by using the input device.

The output I/F is connected to the display device such as a monitor through a cable. Image information is output from the output I/F to the display device, so that an image is displayed on the display device.

The second communication I/F is connected to the communication network 11. The communication program to be described later is configured to perform communication through the second communication I/F. Specifically, the communication program is configured to perform transmission to the IP addresses of the information processing terminal (not shown), the MFP 20 and the portable terminal 40 and to receive communication to the IP address thereof. The second communication I/F of the information processing apparatus 30 is an example of the network interface.

The CPU and the communication bus have the same configurations as those of the CPU 47 and the communication bus 49 of the portable terminal 40. The CPU of the information processing apparatus 30 is an example of the computer.

The memory has a program storage area in which programs such as an OS, a control program, a communication program and the like are stored. The OS, the control program, and the communication program stored in the program storage area are executed in the CPU. The OS has the same configuration as the OS 71 of the portable terminal 40.

The control program is a program configured to perform display control of generating and outputting image information to the display device, receiving control of receiving an input from the input device, management of the plurality of MFPs 20, and the like.

The communication program is a program configured to control communication with the above-described information processing terminal (not shown), the MFP 20 and the portable terminal 40.

Meanwhile, in the specification, the processing of the CPU 47 that is to be executed in accordance with the commands described in the program is described. That is, in the below descriptions, the processing of "determination", "extraction", "selection", "calculation", "decision", "specifying", "acquisition", "receiving", "control", "setting" and the like indicates the processing of the CPU 47. The processing that is to be executed by the CPU 47 includes hardware controls through the OS 71, too. "acquisition" is used as a concept that does not necessarily require a request. That is, processing of receiving data without a request of the CPU 47 is also included in the concept "the CPU 47 acquires data". In the specification, "data" is expressed by a bit string that can be read by a computer. The data having substantially the same meaning and the different formats is handled as the same data. This also applies to the "information" of the specification. The processing of "command", "response", "request" and the like is performed by communicating information indicative of "command", "response", "request" and the like. The language of "command", "response", "request" and the like may be described as meanings of the information itself indicative of "command", "response", "request" and the like.

The CPU 47 configured to execute the printing setting program 74 and the like may be simply described as a program name. For example, the description "the printing setting program 74 is" may mean that "the CPU 47 configured to execute the printing setting program 74 is".

The memory has a data storage area in which data and information necessary to execute the control program and the communication program are stored. In the data storage area, an IP address allotted thereto and IP addresses of the information processing terminal (not shown), the MFP 20 and the portable terminal 40 are stored. In the data storage area, a setting list (FIG. 14) of the MFP 20 input from the portable terminal 40 is stored. The details will be described later.

[Each Processing to be Executed by Printing Setting Program 74]

Subsequently, each processing that is to be executed by the printing setting program 74 is described. Specifically, each processing that is executed by the printing setting program 74 when the user performs the initial setting of the printing setting for each MFP 20 with the portable terminal 40 is described.

Figure 6A:
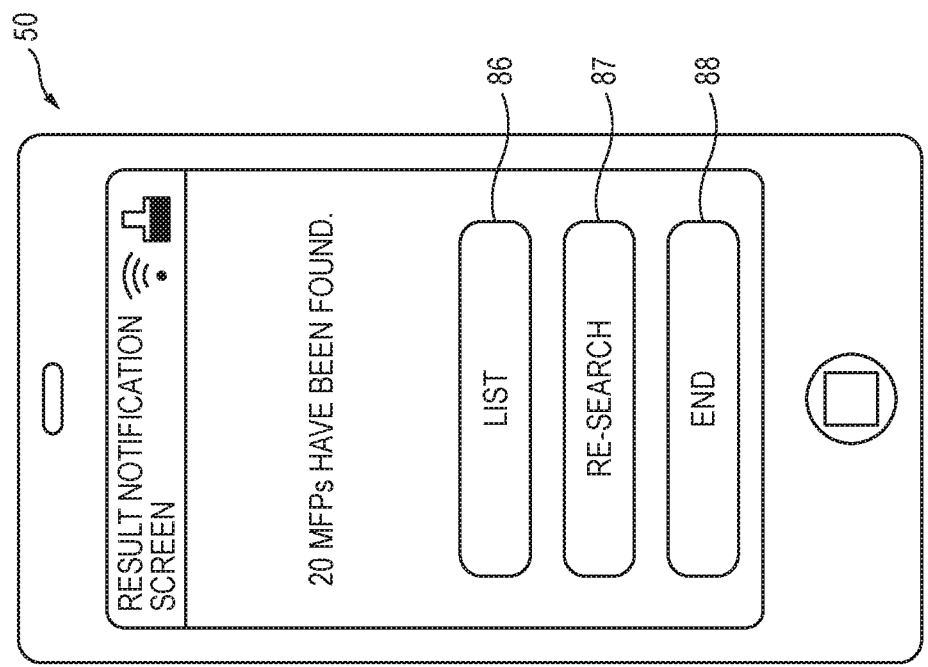
FIG. 6A depicts a mode selection screen.

When the printing setting program 74 is activated by the user (administrator), a mode selection screen (FIG. 6A) is displayed on the display 41. The mode selection screen includes a "MFP search" icon 81, a "group setting/registration" icon 82, and an "end" icon 83. The printing setting program 74 monitors whether an icon is selected by the user.

When it is determined that the user has selected an icon, the printing setting program 74 determines the icon selected by the user. When it is determined that the user has selected the "MFP search" icon 81, the printing setting program 74 executes MFP search processing.

Figure 2:
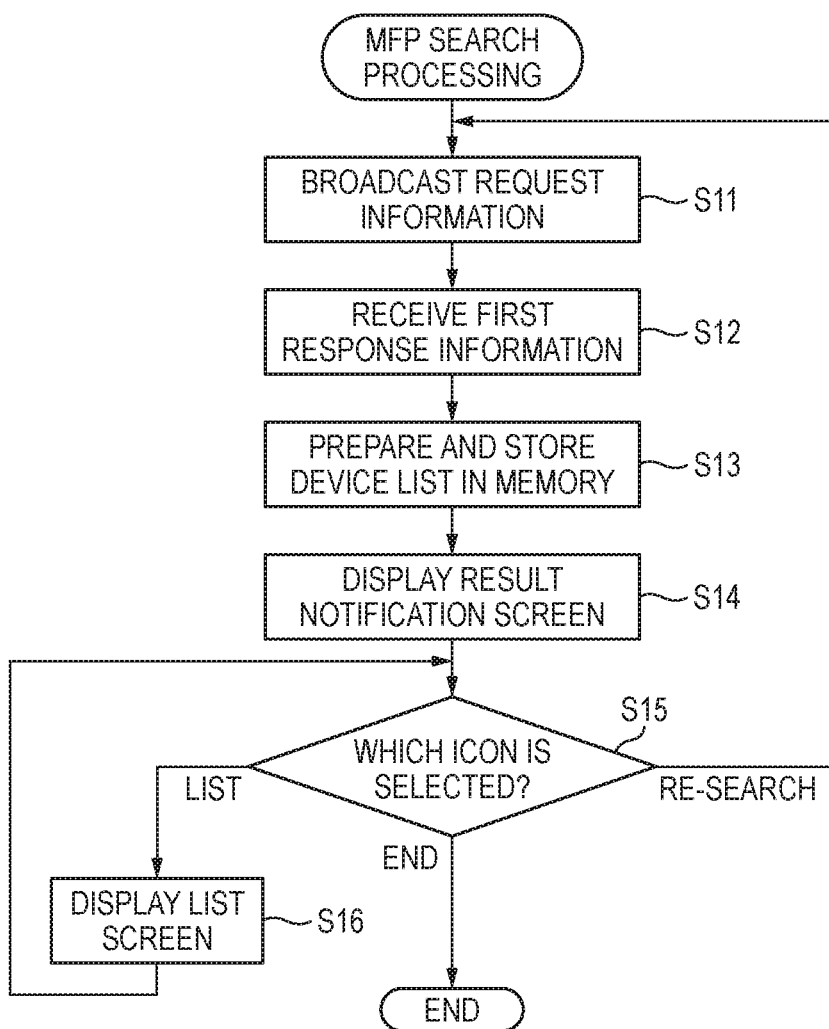
FIG. 2 is a flowchart of MFP search processing.

The MFP search processing is described with reference to FIG. 2. First, the printing setting program 74 displays an MFP search screen (not shown) on the display 41, instead of the mode selection screen. The MFP search screen includes characters "Do you want to search for MFPs?", a "Yes" icon, and a "No" icon. The printing setting program 74 monitors whether an icon is selected by the user.

When it is determined that the user has selected an icon, the printing setting program 74 determines the icon selected by the user. That is, the printing setting program 74 whether or not to start the search of the MFPs 20. When it is determined that the user has selected the "No" icon and has stopped the search of the MFPs 20, the printing setting program 74 ends the MFP search processing.

On the other hand, when it is determined that the user has selected the "Yes" icon and has instructed start of the search of the MFPs 20, the printing setting program 74 broadcasts request information to the communication network 11 through the Wi-Fi 45 (S11). That is, the printing setting program 74 transmits the request information to all nodes (terminals) connected to the communication network 11 without specifying a transmission destination. The processing of step S11 is an example of the second transmission means. In the meantime, a method other than the broadcast may be used inasmuch as it is possible to search for the MFPs 20 connected to the communication network 11.

The request information includes request information for requesting a reply of information including a MAC address, an IP address and an MIB, and the IP address and MAC address of a transmission source (the portable terminal 40). Each MFP 20 having received the second request information sends a reply of first response information including the MAC address, the IP address and MIB thereof to the IP address and MAC address of the portable terminal 40, which is the transmission source. In the meantime, the reply from the MFP 20 is performed in a unicast manner.

The printing setting program 74 receives the first response information transmitted from the MFP 20 (S12), and prepares a device list (FIG. 8). The processing of step S12 receiving the first response information is an example of the first receiving means.

The device list has a plurality of device records. Each device record corresponds to one MFP 20. The device record has two items of a device ID and device information. The device ID has two items of an IP address and a MAC address. The device information has a plurality of items of a model name, a size, a color, a scan and the like. The item "model name" indicates a model name such as "MFP-A" and "MFP-B". The item "size" indicates "A4", "A4/A3" and the like. "A4" indicates that printing can be performed on only a sheet of A4 size, and "A4/A3" indicates that printing can be performed on sheets of A4 size and A3 size. The item "color" indicates "monochrome", "monochrome/color", and the like. "monochrome" indicates that only monochrome printing can be performed, and "monochrome/color" indicates that monochrome printing and color printing can be performed. The item "scan" indicates "possible" and "impossible". "possible" indicates that there is a scanner and scan can be thus performed. "impossible" indicates that there is no scanner and scan cannot be thus performed.

When the printing setting program 74 has prepared the device list, the printing setting program 74 stores the prepared device list in the memory 48 (S13). The printing setting program 74 counts the number of the device records, i.e., the number of the MFPs 20 connected to the communication network 11, and stores the same in the memory 48, as the number of registration-expected devices. The processing of step S13 is an example of the second storing means. The device ID stored in the device list is an example of the found device ID.

In the meantime, the printing setting program 74 may execute the broadcast of step S11 more than once, considering collision on the communication network 11. When the first response information is received from the MFP 20, which is not registered as the device record in the device list, the printing setting program 74 adds a new device record corresponding to the MFP 20 to the device list.

Subsequently, the printing setting program 74 displays a result notification screen (FIG. 6B) on the display 41, instead of the device search screen (S14). The result notification screen includes characters "The 20 MFPs have been found", a "list" icon 86, a "re-search" icon 87, and an "end" icon 88. The number "20" indicates the number of the found MFPs 20, and is the number of registration-expected devices stored in the memory 48.

Figure 6B:
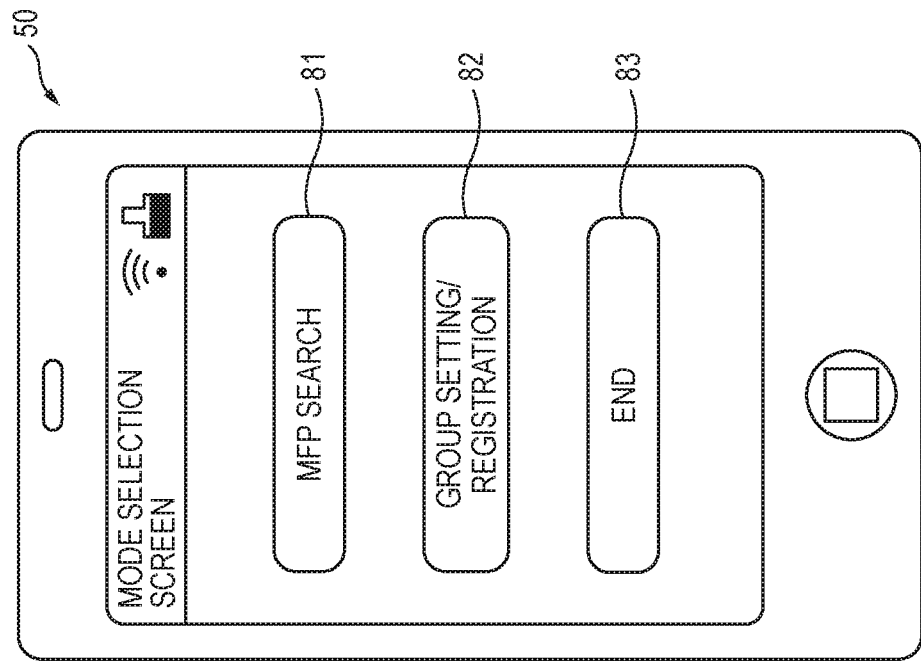
FIG. 6B depicts a result notification screen.

Subsequently, the printing setting program 74 monitors whether an icon is selected by the user on the result notification screen (FIG. 6B). When it is determined that the user has selected an icon, the printing setting program 74 determines the selected icon (S15).

When it is determined that the "re-search" icon 87 has been selected (S15: re-search), the printing setting program 74 re-executes the processing from step S11 to step S14. For example, when there is an MFP 20 for which the user has forgotten the connection to the communication network 11, the user connects the corresponding MFP 20 to the communication network 11 and selects the "re-search" icon 86 to re-execute the search of the MFP 20.

Figure 7A:
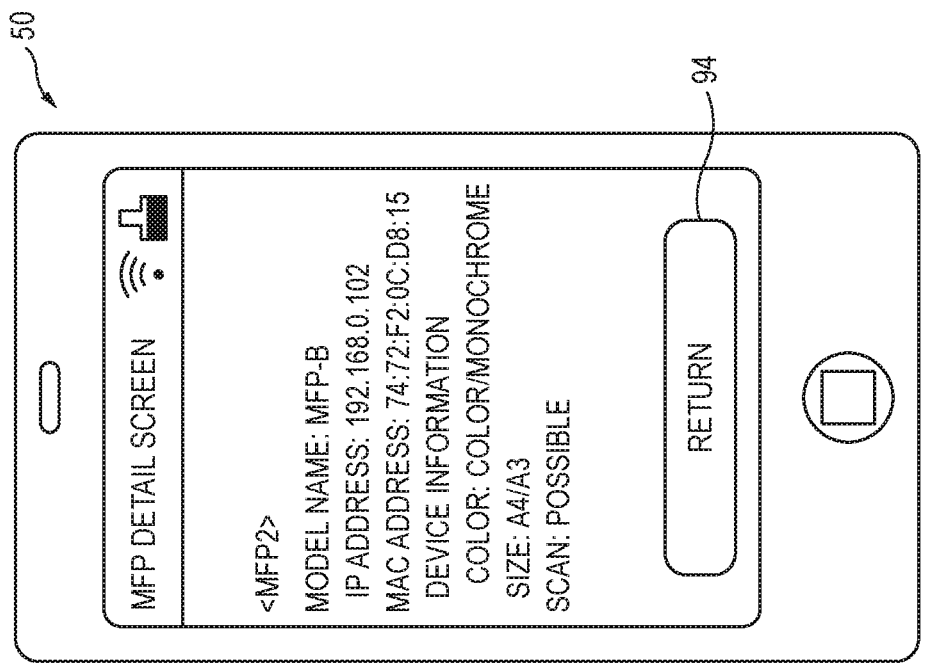
FIG. 7A depicts a list.

When it is determined that the "list" icon 86 has been selected (S15: list), the printing setting program 74 displays a list screen (FIG. 7A), instead of the result notification screen (S16). The list screen includes a plurality of device icons 89, 90, 91, 92 . . . indicative of the found MFPs 20, a scroll bar 121, and a "return" icon 93.

Figure 7B:
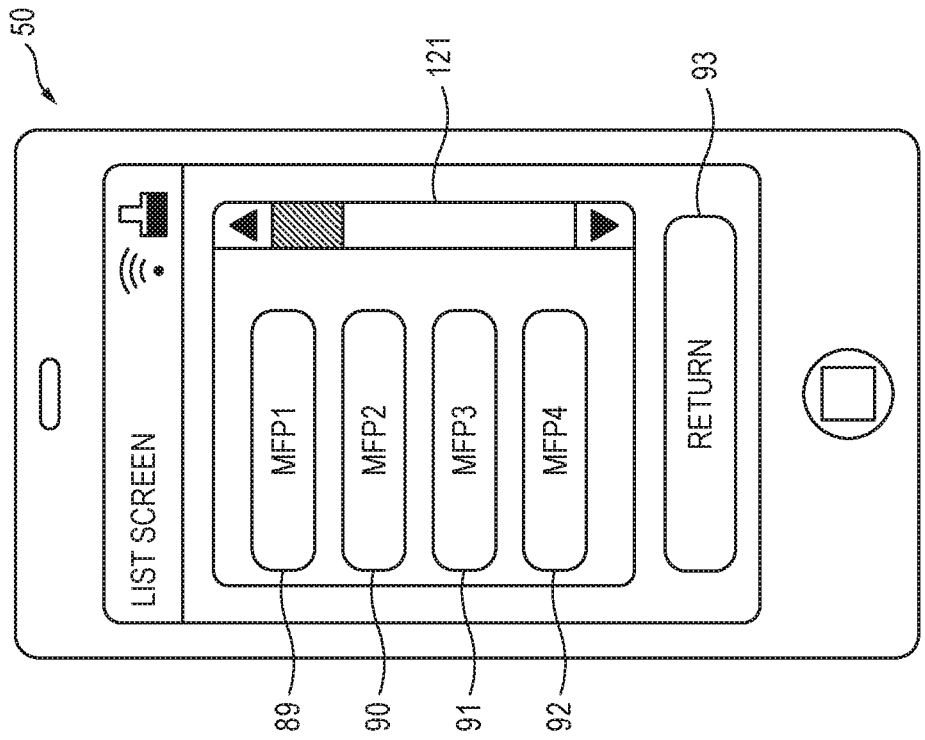
FIG. 7B depicts an MFP detail screen.

The scroll bar 121 is to scroll the display of the device icons 89, 90, 91, 92 . . . . Although not shown in the flowchart, when any one of the device icons 89, 90, 91, 92 . . . is selected by the user, an MFP detail screen (FIG. 7B) is displayed on the display 41, instead of the list screen. The MFP detail screen displays contents indicated by the device record of the device list (FIG. 8). That is, a model name, a device ID (that is, an IP address and a MAC address) and device information are displayed on the display 41. The detail display screen has a "return" icon 94. When the "return" icon 94 is selected by the user, the list screen (FIG. 7A) is displayed on the display 41, instead of the MFP detail screen.

The printing setting program 74 monitors whether the "return" icon 93 on the list screen has been selected by the user. When it is determined that the "return" icon 93 has been selected by the user, the printing setting program 74 again displays the result notification screen (FIG. 6B) on the display 41, instead of the list screen. The result notification screen, the list screen, and the MFP detail screen are displayed on the display 41, so that the user can check the details of the found MFPs 20.

When it is determined that the "end" icon 88 on the result notification screen has been selected by the user (S15: end), the printing setting program 74 ends the device search processing.

Figure 3A:
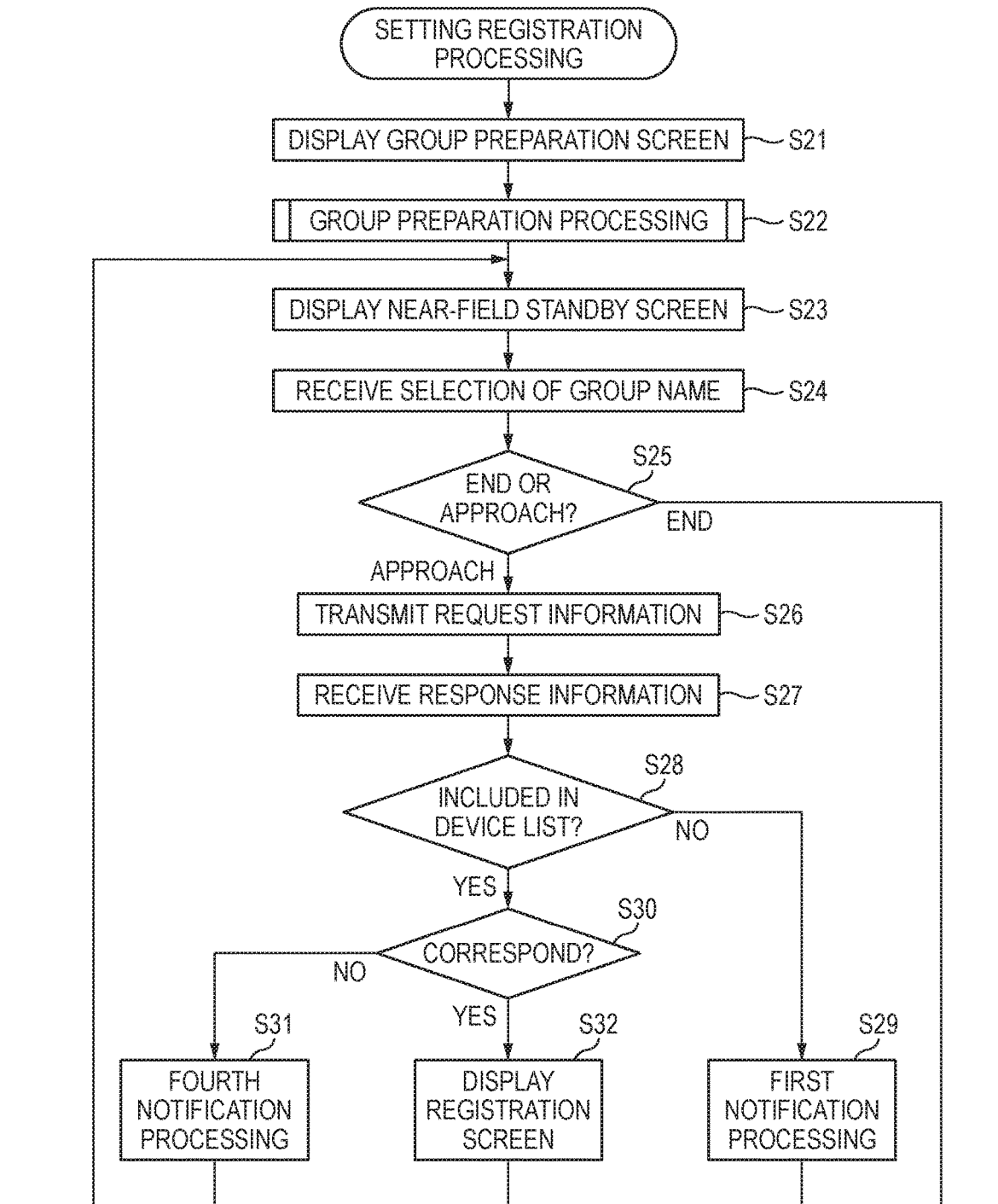
FIGS. 3A and 3B are flowcharts of setting registration processing.
Figure 3B:
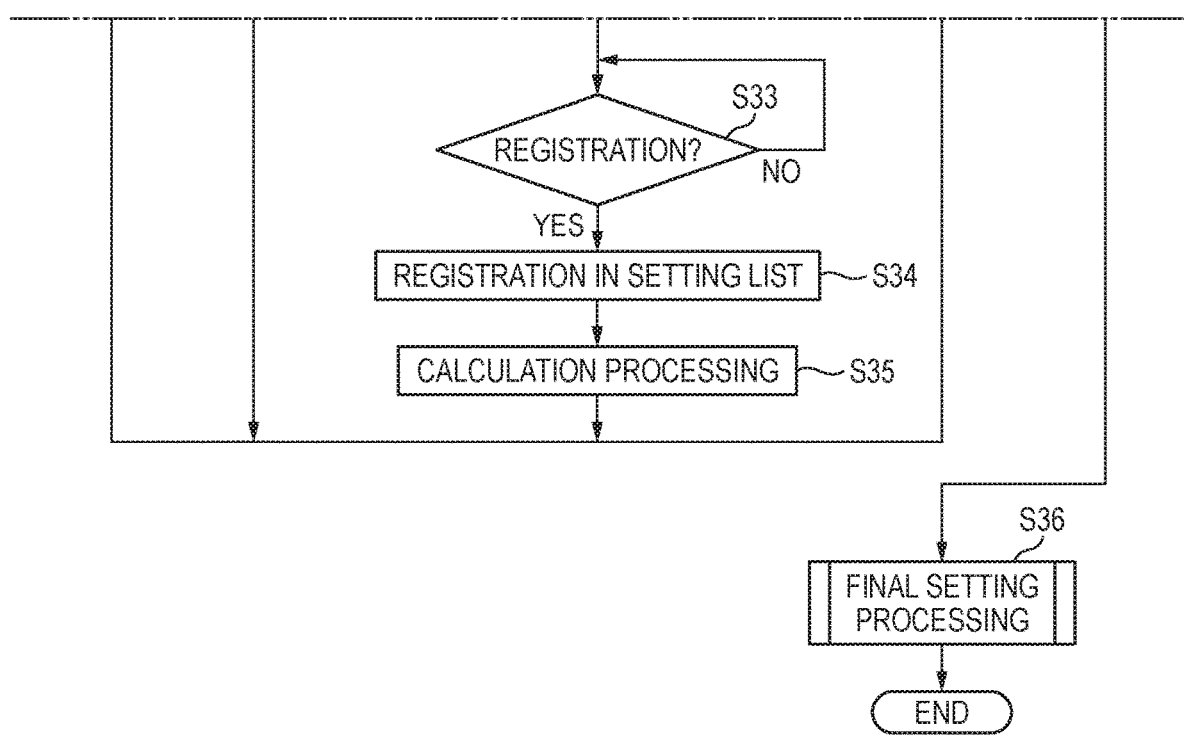

When the device search processing is over, the printing setting program 74 displays the mode selection screen (FIG. 6A) on the display 41. When it is determined that the "group setting/registration" icon 82 on the mode selection screen has been selected by the user, the printing setting program 74 executes group preparation processing shown in FIGS. 3A and 3B.

First, the printing setting program 74 displays a group preparation screen (FIG. 9A) on the display 41, instead of the mode selection screen (S21).

The group preparation screen includes a plurality of group icons 95, 96, 97 . . . , a scroll bar 122, characters "the number of non-setting devices: 20 devices", a "group addition" icon 98, and an "end" icon 99. The "20 devices" indicate the number of the MFPs 20 that do not belong to any group, and an initial value thereof is the number of the MFPs 20 found in the above-described MFP search processing. The scroll bar 122 is to scroll the display of the plurality of group icons 95, 96, 97 . . . .

Subsequently, the printing setting program 74 executes group preparation processing of receiving an input of the user for causing the MFP 20 to belong to any one group (S22). The processing of step S22 is an example of the first acquisition means, the acquisition means and the first acquisition processing.

Figure 4:
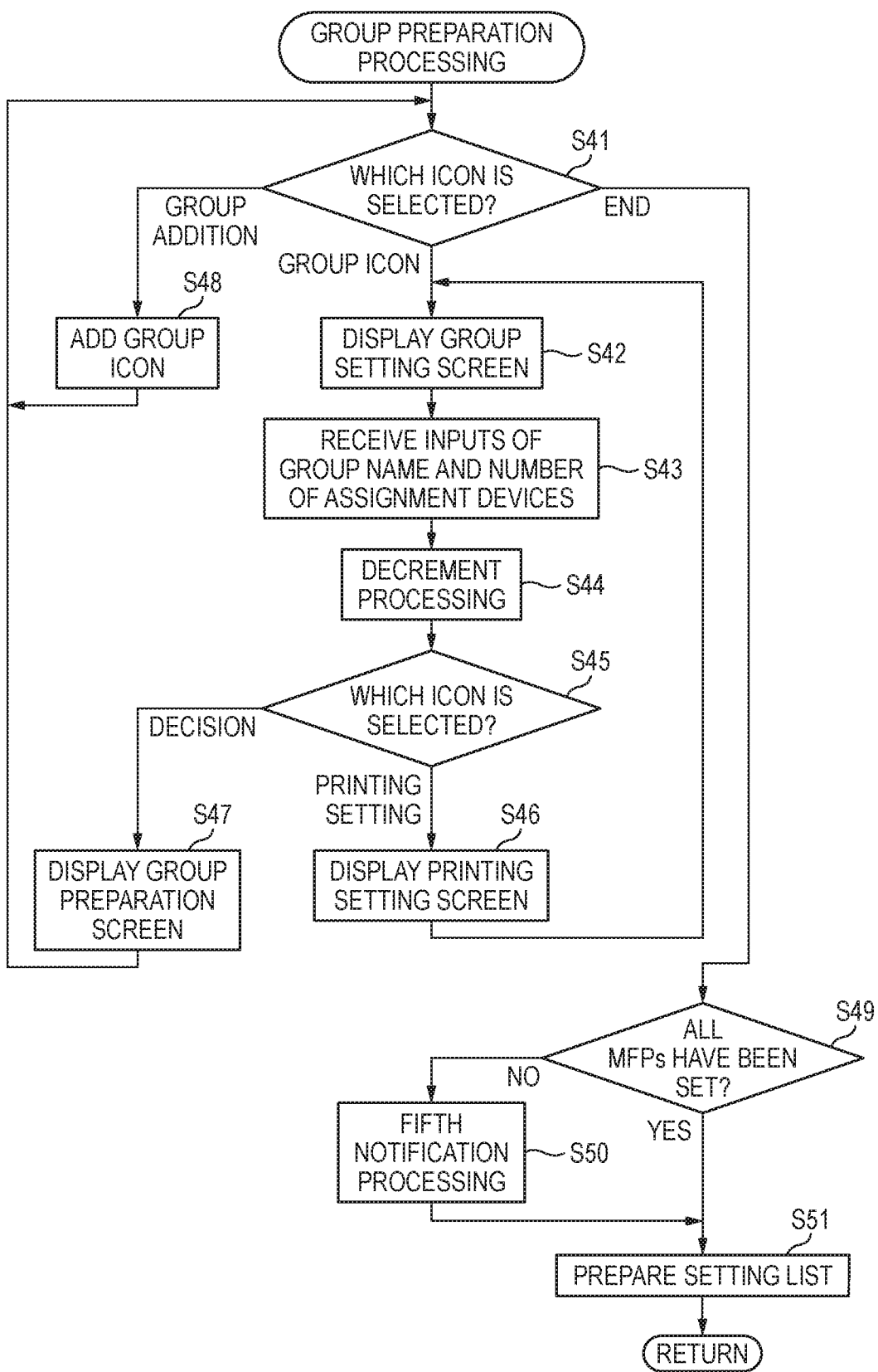
FIG. 4 is a flowchart of group preparation processing.

The group preparation processing is described with reference to FIG. 4. First, the printing setting program 74 monitors whether an icon has been selected by the user on the group preparation screen (FIG. 9A). When it is determined that an icon has been selected by the user, the printing setting program 74 determines the selected icon (S41).

When it is determined that any one of the group icons 95, 96, 97 . . . has been selected (S41: group icon), the printing setting program 74 displays a group setting screen (FIG. 9B) on the display 41, instead of the group preparation screen (S42). The processing of step S42 is an example of the first display means, and the group setting screen is an example of the first screen.

The group setting screen includes characters "group A", characters "group name", a group name input tap 100, characters "number of devices", a device-number pull-down menu 101, characters "number of non-setting devices", a "printing setting" icon 102, and a "decision" icon 103.

The printing setting program 74 receives inputs of the group name and an input of the number of devices through the group name input tap 100 and the device-number pull-down menu 101 on the setting screen (S43). In the shown example (FIG. 9B), "general affairs" is input to the group name input tap 100, and "3" is selected in the device-number pull-down menu 101. "general affairs" input by the group name input tap 100 is an example of the group ID. The number of the MFPs 20 set by the device-number pull-down menu 101 is an example of the number of assignment-expected devices. The processing of step S43 is an example of the third reception means.

When an input of the number of assignment-expected devices is received, the printing setting program 74 calculates a new number of non-setting devices by decrementing the number of assignment-expected devices from the number of non-setting devices (S44), and displays the calculated new number of non-setting devices on the group setting screen. In the shown example, the number of assignment-expected devices "3 devices" is decremented from the number of non-setting devices "20 devices", so that the new number of non-setting devices "17 devices" is displayed. The processing of step S44 is an example of the decrement means.

Figure 10A:
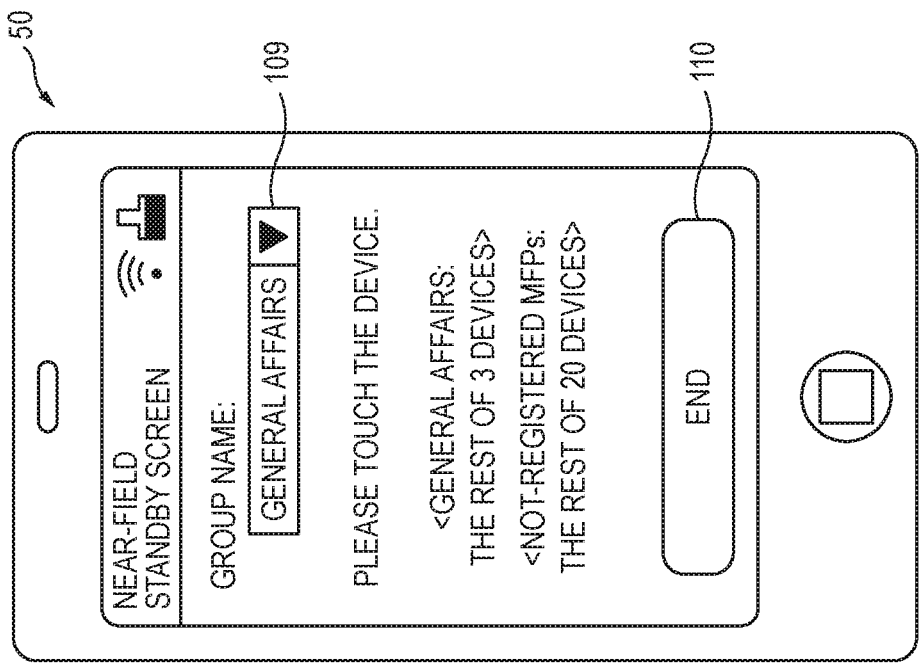
FIG. 10A depicts a printing setting screen.

The printing setting program 74 monitors whether an icon is selected by the user on the group setting screen. When it is determined that an icon has been selected by the user, the printing setting program 74 determines the selected icon (S45). When it is determined that the "printing setting" icon 102 has been selected (S45: printing setting), the printing setting program 74 displays a printing setting screen (FIG. 10A) on the display 41, instead of the group setting screen (S46).

The printing setting screen includes characters "size", a size pull-down menu 104, characters "sheet type", a sheet-type pull-down menu 105, characters "color", a color pull-down menu 106, characters "sheet-number limiting", a sheet-number limiting pull-down menu 107, and an "OK" icon 108.

The printing setting program 74 receives, on the printing setting screen, inputs of the size pull-down menu 104, the sheet-type pull-down menu 105, the color pull-down menu 106 and the sheet-number limiting pull-down menu 107 and selection of the "OK" icon 108 by the user. In the shown example (FIG. 10A), "A4" is selected in the size pull-down menu 104, "normal sheet" is selected in the sheet-type pull-down menu 105, "monochrome" is selected in the color pull-down menu 106, and "100 sheets" is selected in the sheet-number limiting pull-down menu 107. The "A4", "normal sheet", "monochrome" and "100 sheets" input on the printing setting screen are examples of the setting information.

The printing setting program 74 monitor whether the "OK" icon is selected by the user on the printing setting screen. When it is determined that the "OK" icon has been selected by the user, the printing setting program 74 displays the group setting screen on the display 41 (S42), instead of the printing setting screen, and re-executes the processing of steps S43 to S45.

When it is determined that the "decision" icon 103 has been selected on the group setting screen (S45: decision), the printing setting program 74 displays the group preparation screen (FIG. 9A) on the display 41 (S47), instead of the group setting screen, and returns to the processing of step S41. That is, the setting of one group is completed, and a setting of a next group is executed. In the re-displayed group preparation screen (FIG. 9A), the name of the group icon 95 is displayed with being changed from "group A" to "general affairs".

When it is determined that the "group addition" icon 98 has been selected on the group preparation screen (S41: group addition), the printing setting program 74 adds a new group icon (S48), and returns to the processing of step S41.

When it is determined that the "end" icon 99 has been selected on the group preparation screen (S41: end), the printing setting program 74 determines whether all the MFPs 20 found in the MFP search processing belong to any one group (S49). That is, the printing setting program 74 determines whether the number of non-setting devices is zero.

When it is determined that all the MFPs 20 do not belong to any one group (S49: No), the printing setting program 74 executes fifth notification processing (S50). The fifth notification processing is performed by displaying a notification screen shown in FIG. 13A on the display 41, for example. The notification screen includes characters "there are three MFPs that do not belong to any group", characters "Do you want to end the setting?", an "OK" icon 117, and a "cancel" icon 118.

When it is determined that the user has selected "OK" icon 117, the printing setting program 74 ends the fifth notification processing, and proceeds to processing of step S51. Although not shown in the flowchart, when it is determined that the user has selected the "cancel" icon 118, the printing setting program 74 again displays the group preparation screen (FIG. 9A) on the display 41, instead of the notification screen (S21).

On the other hand, when it is determined that all the MFPs 20 have been set (S49: Yes), the printing setting program 74 prepares and stores a setting list (FIG. 14) in the memory 48 (S51), and ends the group preparation processing. When executing the processing of step S51, data is not input in the item of the device ID, i.e., the item of the IP address and the item of the MAC address, and only the group name and the setting information are registered with being associated with each other. The processing of step S51 is an example of the first storing means, the storing processing, and the third storing means.

When the group preparation processing (S22) is over, the printing setting program 74 displays a near-field standby screen (FIG. 10B) on the display 41, instead of the group preparation screen (S23). The processing of step S23 is an example of the second display means. The near-field standby screen is an example of the second screen.

The near-field standby screen includes characters "group name", a group pull-down menu 109, characters "Please touch the device", characters "general affairs: the rest of 3 devices", characters "not-registered MFPs: the rest of 20 devices", and an "end" icon 110.

The "rest of 3 devices" and the "rest of 20 devices" are determined by the number of the MFPs 20 (registration-expected devices) found in the MFP search processing (S14), the number of the MFPs 20 set in the group name selected in the group pull-down menu 109, and the group to which the MFP 20 for which the setting registration has been completed belongs. For example, when the 20 MFPs 20 are found in the MFP search processing, the number of the MFPs 20 set in the group name "general affairs" selected in the group pull-down menu 109 is three and no one MFP 20 is not setting-registered, "general affairs: the rest of 3 devices" and "not-registered MFPs: the rest of 20 devices" are displayed. When the two MFPs 20 have been already setting-registered in "general affairs" and the four MFPs 20 have been already setting-registered in "development", "general affairs: the rest of one device" and "not-registered MFPs: the rest of 14 devices" are displayed. The number of rest devices of the MFPs 20 to be setting-registered is displayed, so that concern that the user will erroneously forget the setting registration is reduced.

The printing setting program 74 receives selection of the group name by the user on the group pull-down menu 109 (S24).

The near-field standby screen is a screen indicating a state where the portable terminal 40 can perform near field communication with the MFP 20. That is, the portable terminal 40 of which the display 41 is displayed thereon with the near-field standby screen is brought close to the MFP 20, so that the portable terminal 40 and the MFP 20 perform near field communication.

When it is determined that the portable terminal 40 has been brought close to the MFP 20, i.e., when it is determined that communication with the MFP 20 has been established (S25: approach), the printing setting program 74 transmits request information from the NFC 46 (S26). The request information is information for requesting a reply of an IP address, a MAC address, and an MIB.

The MFP 20 having received the request information sends a reply of response information including an IP address and a MAC address thereof to the portable terminal 40 through the first communication I/F.

The printing setting program 74 receives the response information replied from the MFP 20 through the NFC 46 (S27). The processing of steps S26 and 27 is an example of the second acquisition means.

The printing setting program 74 determines whether the IP address and MAC address included in the response information are included in the device list (FIG. 8) (S28). That is, the printing setting program 74 determines whether the MFP 20, to which the portable terminal 40 has been brought close, is the MFP 20 found in the MFP search processing. The description "the MFP 20 is not the MFP 20 found in the MFP search processing" means that the MFP 20, to which the portable terminal 40 has been brought close, is not connected to the communication network 11. The processing of step S28 is an example of the first determination means.

When it is determined that the IP address and MAC address included in the response information are not included in the device list (S28: No), the printing setting program 74 executes first notification processing (S29). The first notification processing is executed by displaying a notification screen (FIG. 11B) on the display 41, for example. The notification screen includes characters "This MFP is not connected to the network" and a "return" icon 113. The processing of step S29 is an example of the first notification means. The information displayed on the notification screen (FIG. 11B) is an example of the first notification information.

Although not shown in the flowchart, when it is determined that the "return" icon 113 has been selected by the user, the printing setting program 74 displays the near-field standby screen (FIG. 10B) on the display 41, instead of the notification screen (S23). The notification screen is displayed, so that the user can recognize that the MFP 20, to which the portable terminal 40 has been brought close, is not connected to the communication network 11.

On the other hand, when it is determined that the IP address and MAC address included in the response information are included in the device list (S28: Yes), the printing setting program 74 determines whether a function of the MFP 20, to which the portable terminal 40 has been brought close, can correspond to the printing setting indicated by the setting information input by the user (S30). Specifically, the printing setting program 74 specifies the device information of the MFP 20, to which the portable terminal 40 has been brought close, from the MIB included in the response information. The printing setting program 74 specifies the setting information of the group ("general affairs" and the like), which are being currently set, from the setting list (FIG. 14). The printing setting program 74 determines whether the specified device information can correspond to the specified setting information. For example, when the device information indicates "monochrome" and the setting information is "color", it is not possible to perform the printing setting "color" for the MFP 20, to which the portable terminal 40 has been brought close. In this case, the printing setting program 74 determines that it is not possible to correspond. The processing of step S30 is an example of the fourth determination means. In the meantime, when the MIB is not included in the response information, the printing setting program 74 may specify the device information of the MFP 20, to which the portable terminal 40 has been brought close, from the IP address and MAC address included in the response information and the device list (FIG. 8) stored in the memory 48.

Figure 12A:
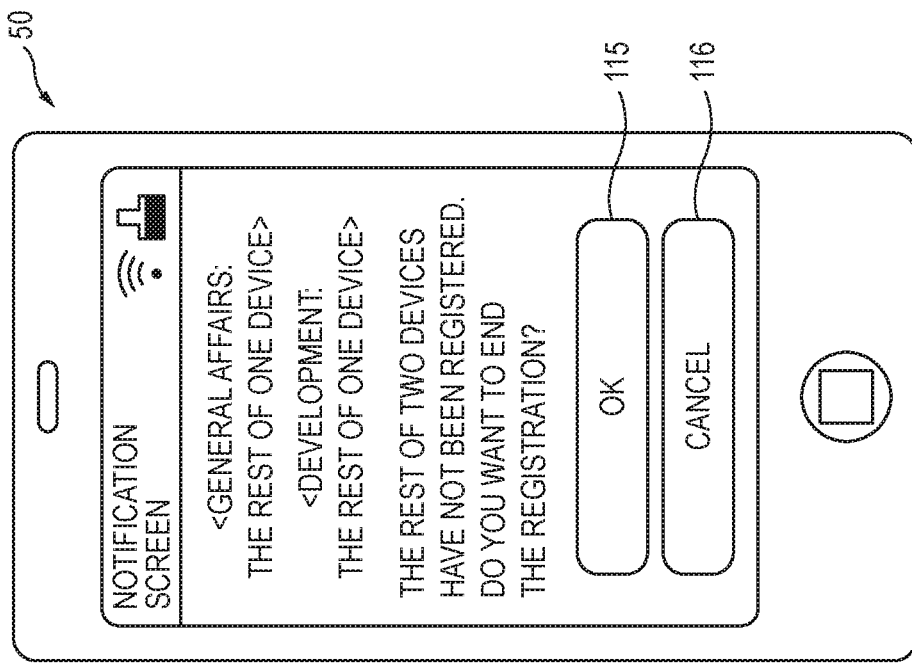
FIGS. 12A and 12B depict the notification screen.

When it is determined that the function of the MFP 20, to which the portable terminal 40 has been brought close, cannot correspond to the printing setting (S30: No), the printing setting program 74 executes fourth notification processing (S31). The fourth notification processing is executed by displaying a notification screen (FIG. 12A) on the display 41, for example. The notification screen includes characters "model name: MFP-A", characters "device information: monochrome", characters "This MFP does not corresponding to the printing setting <color> of planning" and a "return" icon 114. The processing of step S41 is an example of the fourth notification means. The information displayed on the notification screen (FIG. 12A) is an example of the fourth notification information.

When it is determined that the "return" icon 114 has been selected by the user, the printing setting program 74 displays the near-field standby screen (FIG. 10B) on the display 41, instead of the notification screen (FIG. 12A) (S23). The notification screen is displayed, so that the user can recognize that the MFP 20, to which the portable terminal 40 has been brought close, is an MFP 20 not corresponding to the printing setting.

On the other hand, when it is determined that the function of the MFP 20, to which the portable terminal 40 has been brought close, can correspond to the printing setting (S30: Yes), the printing setting program 74 displays a registration screen (FIG. 11A) on the display 41, instead of the near-field standby screen (FIG. 10B) (S32). The registration screen includes characters "group name: general affairs", a table 111 indicating a model name of the MFP 20, to which the portable terminal 40 has been brought close, characters "general affairs: the rest of 3 devices", characters "not-registered device: the rest of 20 devices", and a "registration" icon 112. The registration screen (FIG. 11A) is an example of the third screen. The processing of step S32 is an example of the third display means.

The printing setting program 74 monitors whether the "registration" icon 112 is selected by the user on the registration screen (S33: No). When it is determined that the user has selected the "registration" icon 112 (S33: Yes), the printing setting program 74 registers the IP address and MAC address included in the response information in the setting list (FIG. 14) in association with "general affairs" (S34). The information that is input to the portable terminal 40 as a result of the user's selection on the "registration" icon 112 is an example of the first instruction information and the instruction information. The processing of step S33 is an example of the first reception means. The processing of step S34 is an example of the association processing and the association means.

Figure 10B:
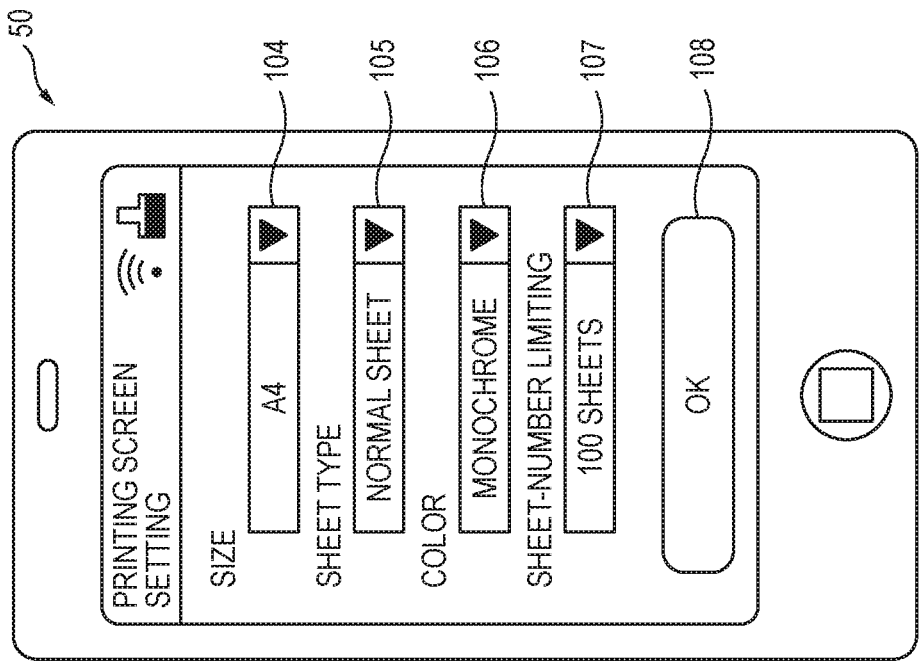
FIG. 10B depicts a near-field standby screen.
Figure 11A:
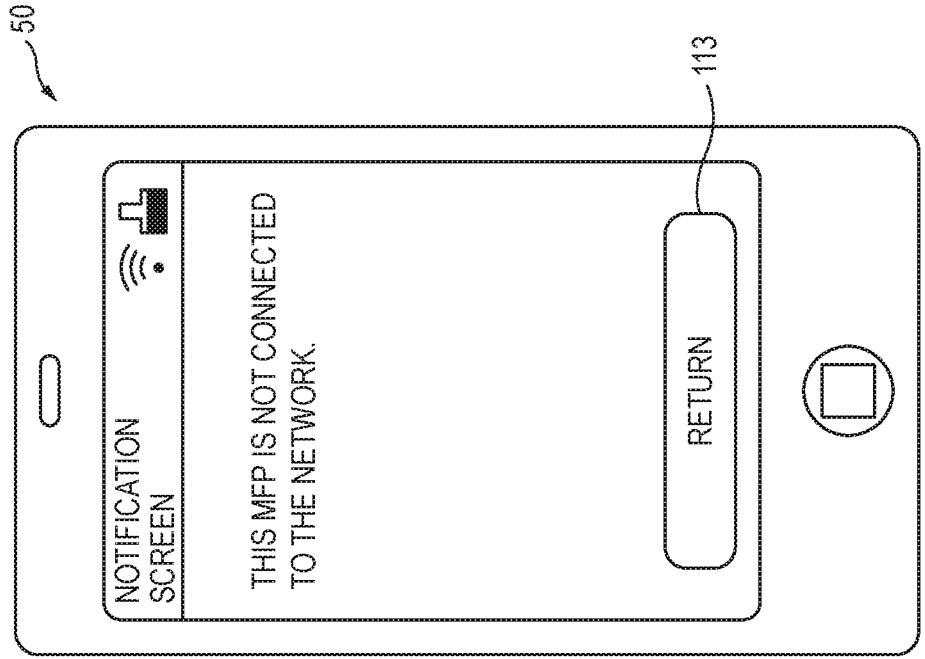
FIG. 11A depicts a registration screen.
Figure 11B:
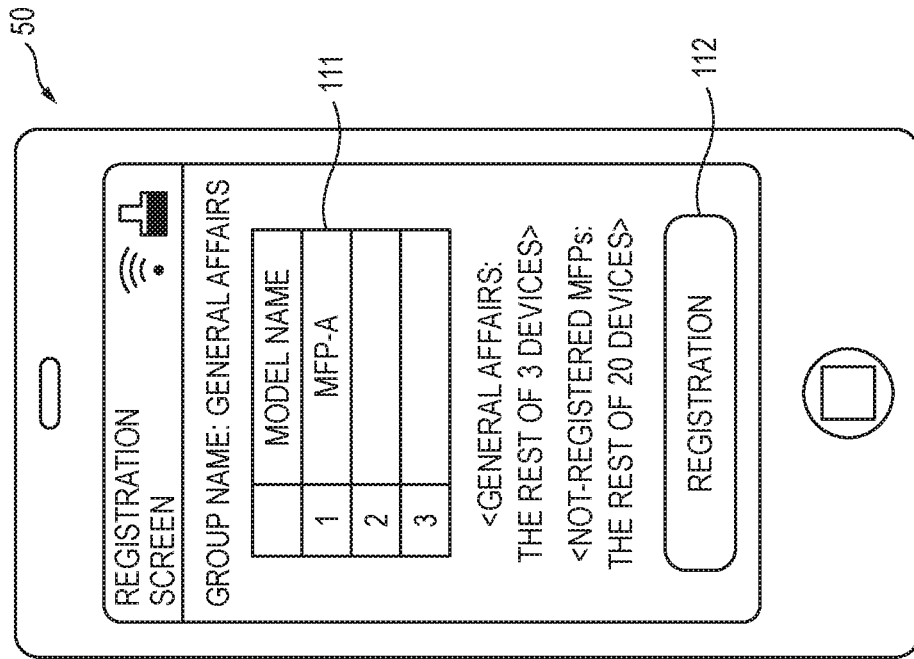
FIG. 11B depicts a notification screen.

Subsequently, the printing setting program 74 executes calculation processing (S35). The calculation processing is processing of decrementing the number of rest devices of the MFPs 20 displayed on the near-field standby screen (FIG. 10B) or the registration screen (FIG. 11A). For example, in the calculation processing, the printing setting program 74 decrements "the number of rest devices" on condition that the user has selected the "registration" icon 112. The calculation processing is executed, so that characters "general affairs: the rest of 2 devices" and characters "not-registered MFPs: the rest of 19 devices" are displayed on the near-field standby screen. In step S35, the processing of decrementing the number of assignment-expected devices of each group such as general affairs is an example of the first calculation means. In step S55, the processing of decrementing the number of rest devices of non-registered MFPs is an example of the second calculation means.

After executing the calculation processing (S35), the printing setting program 74 displays the near-field standby screen on the display 41 (S23). The processing from step S23 to step S34 is repetitively executed, so that the MFPs 20 are registered in each group and the setting list (FIG. 14) is completed. When the registration of all the MFPs 20 is completed, the user selects the "end" icon 110 on the near-field standby screen (FIG. 10B).

When it is determined that the user has selected the "end" icon 110 on the near-field standby screen (FIG. 10B) (S25: end), the printing setting program 74 executes final setting processing (S26). The information that is input to the portable terminal 40 as a result of the user's selection of the "end" icon 110 on the near-field standby screen is an example of the second instruction information, and the processing of receiving the selection of the "end" icon 110 is an example of the second reception means.

Figure 5B:
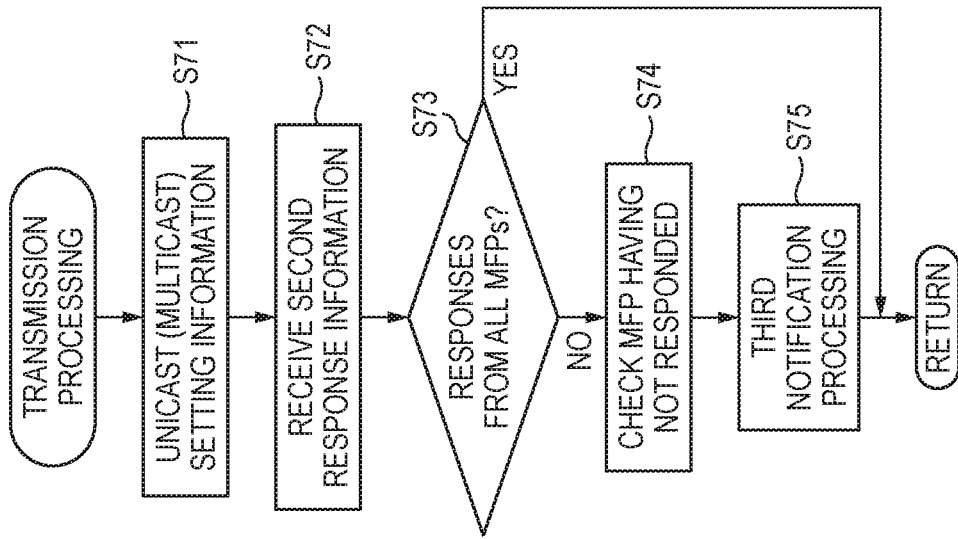
FIG. 5B is a flowchart of transmission processing.
Figure 5A:
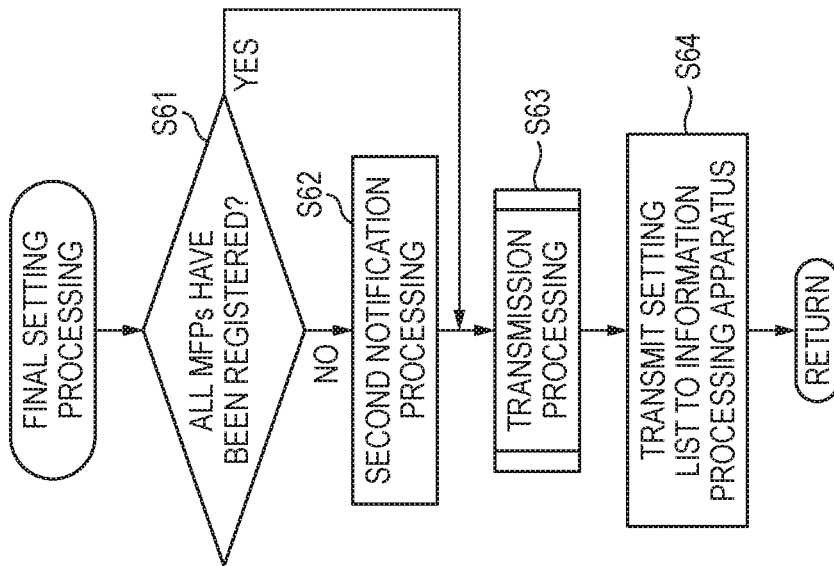
FIG. 5A is a flowchart of final setting processing.

As shown in FIG. 5A, in the final registration processing, the printing setting program 74 determines whether all the MFPs 20 found in the MFP search processing have been set (S61). Specifically, the printing setting program 74 determines whether the number of non-registered MFPs calculated in the calculation processing (S35) is zero. When it is determined that all the MFPs 20 have not been registered (S61: No), the printing setting program 74 executes second notification processing (S62). The processing of step S61 is an example of the second determination means. The processing of step S62 is an example of the second notification means.

The second notification processing is executed by displaying a notification screen (FIG. 12B) on the display 41, for example. The notification screen includes characters "general affairs: the rest of one device", characters "development: the rest of one device", characters "the rest of two devices have not been registered. Do you want to end the registration?", an "OK" icon 115 and a "cancel" icon 116. The information displayed on the notification screen (FIG. 12B) is an example of the second notification information.

Although not shown in the flowchart, when it is determined that the "OK" icon 115 has been selected by the user, the printing setting program 74 displays a registration screen (not shown) on the display 41, instead of the notification screen. The registration screen includes characters "~under registration~", for example. The registration screen is displayed during execution of the transmission processing shown in FIG. 5B.

Figure 12B:
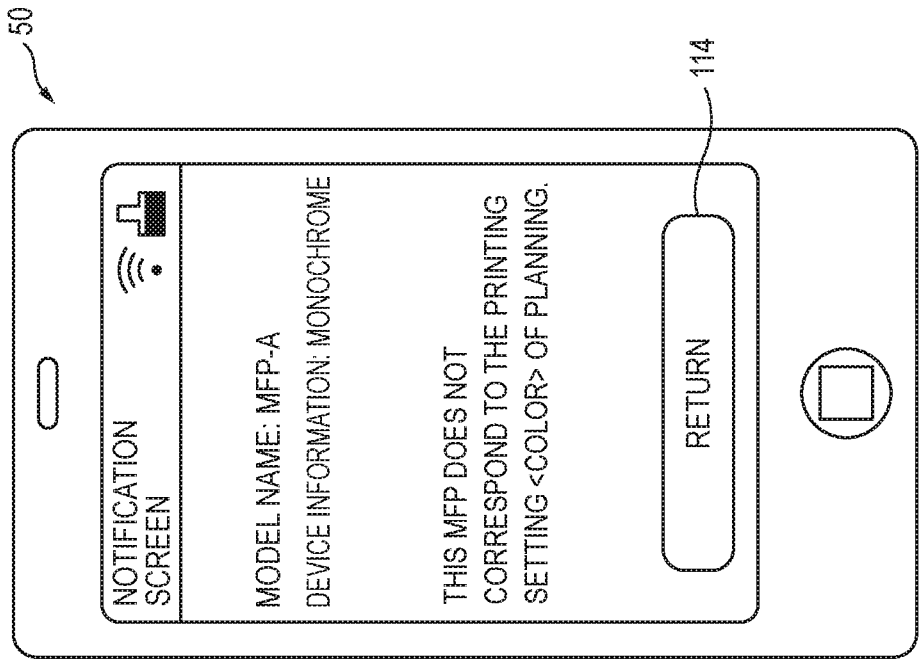

On the other hand, when it is determined that the "cancel" icon 116 has been selected by the user on the notification screen shown in FIG. 12B, the printing setting program 74 returns to the processing of step S23 and displays the near-field standby screen (FIG. 10B) on the display 41.

When it is determined that all the MFPs 20 have been registered (S61: Yes), the printing setting program 74 executes the transmission processing (S63).

As shown in FIG. 5B, in the transmission processing, the printing setting program 74 unicasts the setting information through the Wi-Fi 45 (S71). Specifically, each setting information associated with each IP address registered in the setting list is unicast to each IP address. The processing of step S71 is an example of the first transmission means and the transmission processing. In the meantime, the information to be unicast includes the IP address and MAC address of the portable terminal 40, as the address of the transmission source, in addition to the setting information. In the meantime, multicast of transmitting the setting information to a plurality of IP addresses at a time may be used instead of the unicast.

The MFP 20 receives the setting information transmitted to the IP address thereof, and changes the printing setting thereof in accordance with the received setting information. The MFP 20 having received the setting information sends a reply of second response information, which indicates that the setting information has been received, to the IP address of the transmission source (to the portable terminal).

The printing setting program 74 receives the second response information, and determines whether the second response information has been replied from all the MFPs 20 to which the setting information has been unicast (S72). The processing of receiving the second response information is an example of the second receiving means, and the processing of step S72 is an example of the third determination means.

When it is determined that the second response information has been replied from all the MFPs 20 (S73: Yes), the printing setting program 74 ends the transmission processing. When it is determined that the second response information has not been replied from all the MFPs 20 (S73: No), the printing setting program 74 performs a retry by a predetermined number of times, checks an IP address of the MFP 20 from which the second response information could not be received (S74), and executes third notification processing (S75). The processing of step S75 is an example of the third notification means.

The third notification processing is executed by displaying a notification screen (FIG. 13B) on the display 41, instead of the registration screen, for example. The notification screen includes characters "There is an MFP for which the setting registration cannot be performed. Please check the network connection.", characters "assignment: general affairs", characters "model name: MFP-A", characters "IP address: 192.168.9.101", characters "MAC address: 74:72:F2:0E:D8:05", a "confirm OK" icon 119, and an "end" icon 120. The information displayed on the notification screen (FIG. 13B) is an example of the third notification information.

Although not shown in the flowchart, when it is determined that the user has selected the "confirm OK" icon 119, the printing setting program 74 re-executes the unicast to the MFP 20 from which the second response information could not be received. On the other hand, when it is determined that the user has selected the "end" icon 120, the printing setting program 74 ends the third notification processing (S75), instead of the notification screen shown in FIG. 13B, and ends the transmission processing.

As shown in FIG. 5A, when the printing setting program 74 executes the transmission processing (S63), the printing setting program 74 transmits the setting list (FIG. 14) to the information processing apparatus 30 (S64), and ends the processing. The processing of step S64 is an example of the third transmission means.

The information processing apparatus 30 having received the setting list prepares a management list on the basis of the setting list. The user (administrator) performs the setting registration of the MFP 20 by using the portable terminal 40 that can be carried, and manages the MFP 20 by using the information processing apparatus 30 that is large and cannot be carried.

When the printing setting program 74 ends the execution of the setting registration processing (FIGS. 3A and 3B), the printing setting program 74 displays the mode selection screen (FIG. 6A) on the display 41, instead of the registration screen.

When it is determined that the user has selected the "end" icon 83 on the mode selection screen, the printing setting program 74 ends all the processing.

Effects of Illustrative Embodiment

In the illustrative embodiment, it is possible to perform the initial setting of the printing setting of the MFP 20 (hereinafter, referred to as 'setting registration of the MFP 20') with only the portable terminal 40. Therefore, it is possible to save the time necessary for the setting registration of the MFP 20, as compared to the configuration of the related art where the user should return to the equipment place of the information processing apparatus 30 whenever the setting registration of one group is completed. When performing the setting registration of the MFP 20, a behavior of a person other than a person who performs the setting registration does not have an influence on success or failure of the setting registration. Accordingly, concern about an error of the setting registration is reduced.

Then the device ID (the IP address and the MAC address) acquired by the near field communication does not coincide with the found device ID (S28: No), the first notification processing (S29, FIG. 11B) is executed. Accordingly, concern that the MFP 20, which is not connected to the communication network 11, will be erroneously registered is reduced.

There is the found device ID that does not coincide with the device ID acquired by the near field communication (S61: No), the second notification processing (S62, FIG. 12B) is executed. Accordingly, concern that the user will erroneously forget to register the MFP 20 to be setting-registered is reduced.

When there is the MFP 20, which has not sent the reply of the second response information, of the MFPs 20 to which the setting information has been transmitted so as to perform the initial setting (S73: No), the third notification processing (S75, FIG. 13B) is executed. Accordingly, concern that the MFP 20 to be setting-registered will not be erroneously registered is reduced.

Since the setting list (FIG. 14) prepared by the portable terminal 40 is transmitted to the information processing apparatus 30 (S64), it is possible to manage the MFPs 20 in the information processing apparatus 30 (FIG. 15).

Since the group setting screen (FIG. 9B) configured to receive the setting information, the near-field standby screen (FIG. 10B) configured to receive the selection of the associated group and the registration screen (FIG. 11A) configured to receive the registration are displayed on the display 41 of the portable terminal 40, it is possible to easily enable the user to execute the setting registration of the MFP 20.

As shown in <general affairs: the rest of three devices> in FIG. 10B, whenever the MFP 20 is registered with being associated with the group name, the number of assignment-expected devices is decremented and displayed. Accordingly, concern that the MFP 20, which the user has forgotten to register, will occur is reduced.

Figure 9B:
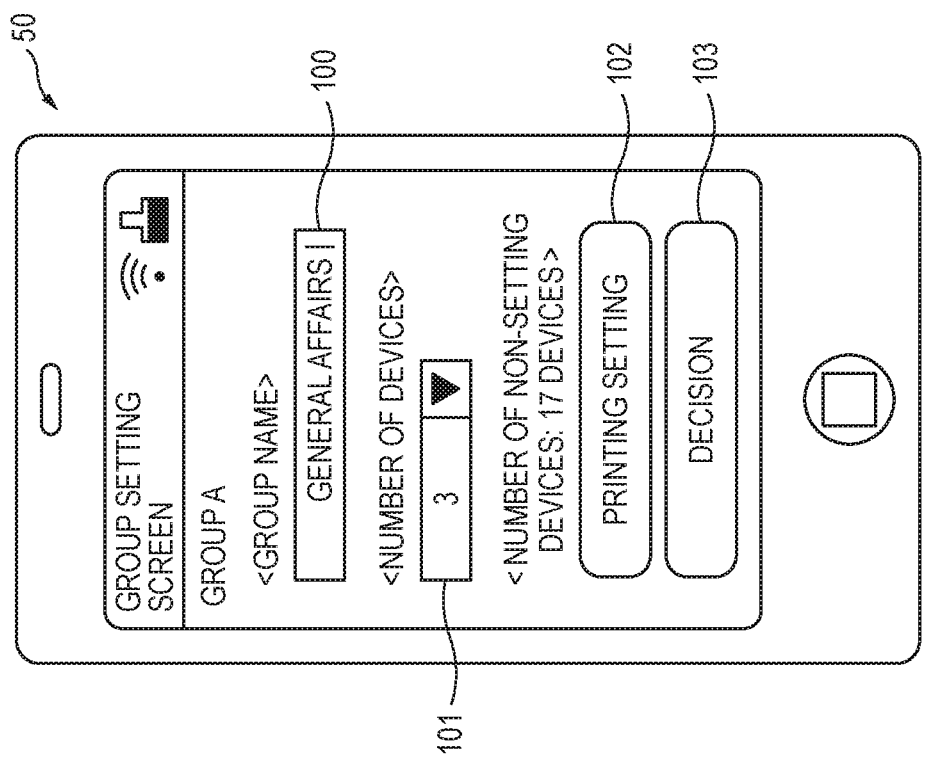
FIG. 9B depicts a group setting screen.
Figure 9A:
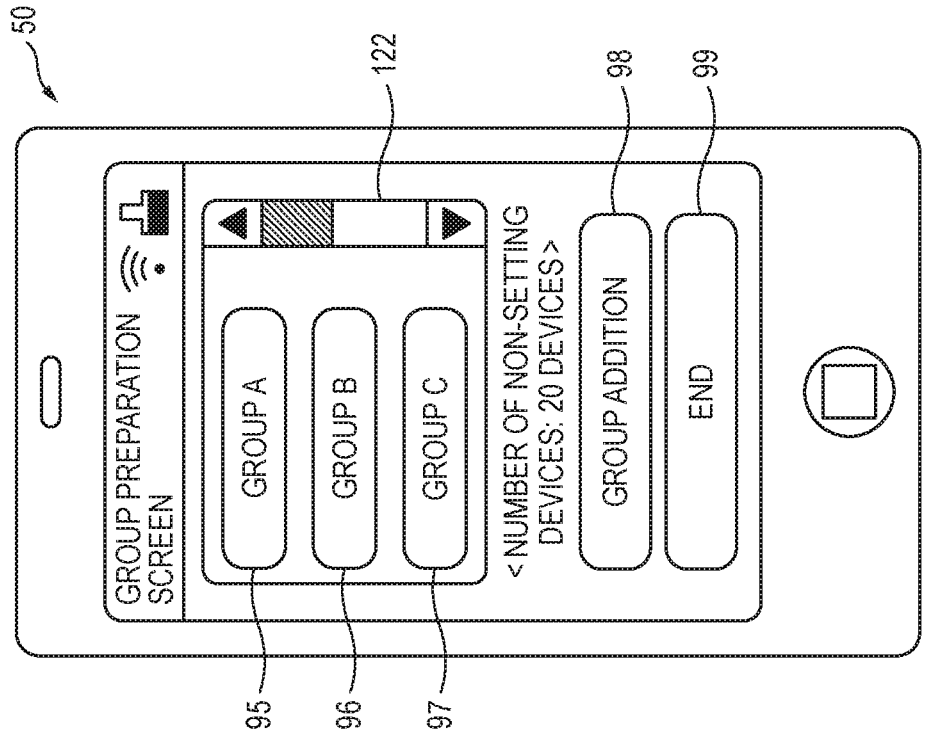
FIG. 9A depicts a group preparation screen.

As shown in <the number of non-setting devices: 17 devices> in FIG. 9B, whenever the number of the MFPs 20 made to be belong to each group is input, the number of non-setting devices is decremented and displayed. Accordingly, upon the setting, concern that the MFP 20, which the user has forgotten to put in the group, will occur is reduced.

As shown in <not-registered MFPs: the rest of 20 devices> in FIG. 11A, whenever the user registers the MFP 20, the number of the non-registered MFPs 20 is decremented and displayed. Accordingly, the concern that the MFP 20, which the user has forgotten to register, will occur is further reduced.

When the function of the MFP 20 cannot correspond to the setting information set by the user (S30: No), the fourth notification processing (S31, FIG. 12A). Accordingly, concern that the MFP 20 incapable of corresponding to the setting information set by the user will be erroneously registered is reduced.

First Modified Embodiment

In the above-described illustrative embodiment, the example where the printing setting program 74 of the portable terminal 40 searches for the MFP 20 and performs the setting registration of the MFP 20 has been described. In a first modified embodiment, an example where the printing setting program 66 (FIG. 16) of the information processing apparatus 30 performs the setting registration of the MFP 20 by using the portable terminal 40 is described. In the below, the same configurations and processing as the illustrative embodiment are denoted with the same reference numerals, and the descriptions thereof are omitted. The printing setting program 66 is an example of the program. The CPU of the information processing apparatus 30 is an example of the computer.

The portable terminal 40 of the first modified embodiment includes an information collection program 77 (FIG. 16), instead of the printing setting program 74. The information collection program 77 is a program configured to collect information from the MFP 20 by the near field communication and to transmit the collected information to the information processing apparatus 30 through the communication network 11.

Figure 16:
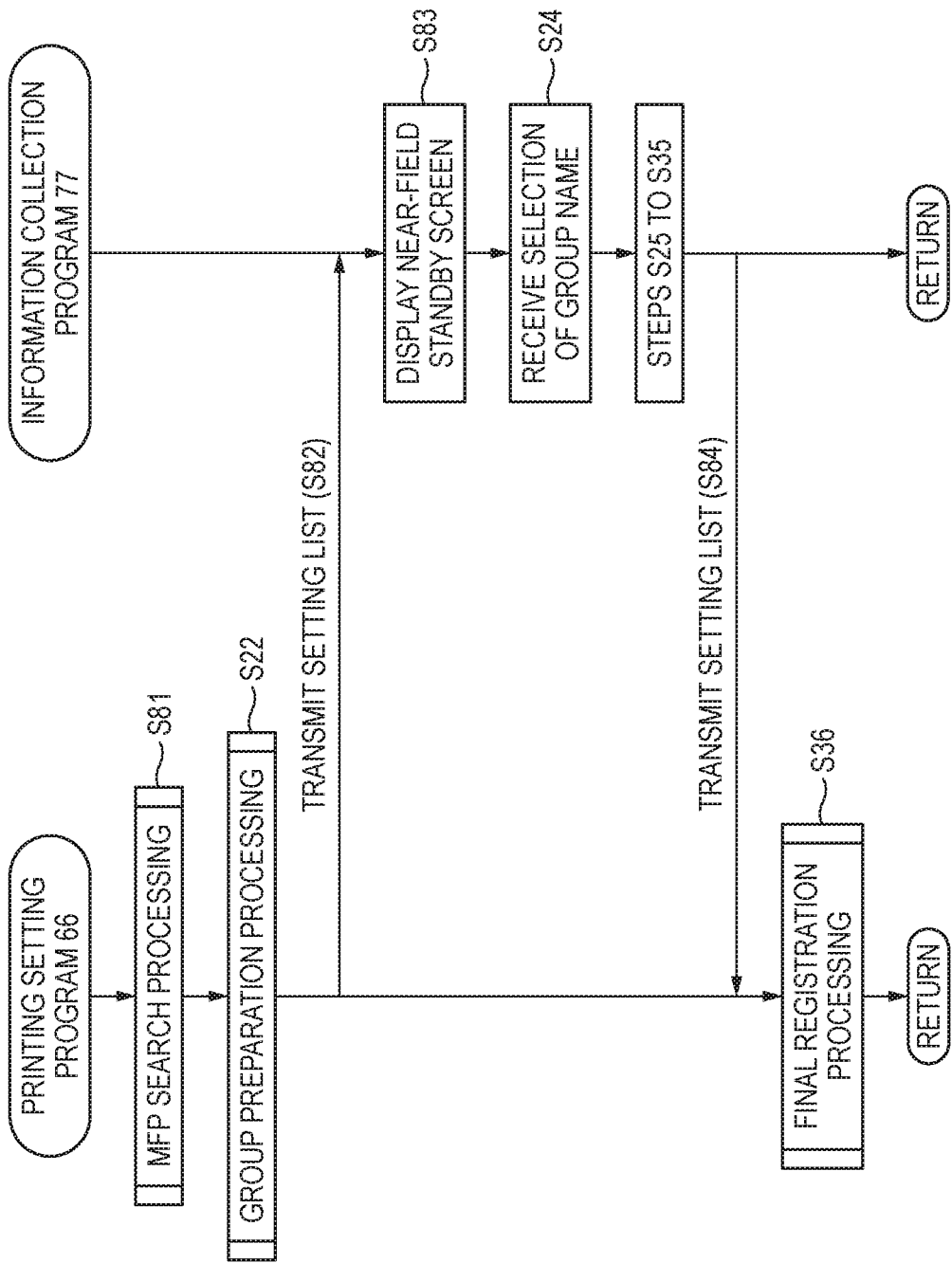
FIG. 16 depicts processing of a first modified embodiment.

In the below, operations of the printing setting program 66 of the information processing apparatus 30 and the information collection program 77 of the portable terminal 40 are described with reference to FIG. 16.

When the printing setting program 66 is activated by the user (administrator), the printing setting program 66 displays a screen of the same contents as the mode selection screen (FIG. 6A) on a display device (monitor). The printing setting program 66 executes MFP search processing (S81) and group preparation processing (S22) in the similar manner to the above-described illustrative embodiment.

In the group preparation processing (S22), the processing of acquiring the group name such as "general affairs" and the setting information is an example of the acquisition means and the acquisition processing. The processing of associating the acquired group name and setting information and registering the same in the setting list is an example of the first storing means and the storing processing.

Subsequently, the printing setting program 66 transmits the setting list (FIG. 14) prepared in the group preparation processing (S22) to the IP address of the portable terminal 40 through the second communication I/F (S82). The processing of step S82 is an example of the first transmission means and the first transmission processing.

The information collection program 77 of the portable terminal 40 having received the setting list displays the near-field standby screen (FIG. 10B) on the display 41 (S83). The user (administrator) selects a group to be registered from the group pull-down menu. That is, the information collection program 77 receives selection of the group name (S24).

Subsequently, the information collection program 77 executes the processing from step S25 to step S35 (FIGS. 3A and 3B) in the similar manner to the above-described illustrative embodiment. That is, the user selects the group name, brings the portable terminal 40 close to each MFP 20 and allots each MFP 20 to each group. In the processing from step S25 to step S35, the information collection program 77 associates each group and the device ID of the MFP 20 made to belong to each group each other, and registers the same in the setting list to complete the setting list.

When the user completes the allocation of the MFPs 20, the user selects the "end" icon 110 on the near-field standby screen (FIG. 10B). When it is determined that the "end" icon 110 has been selected by the user, the information collection program 77 transmits the setting list to the IP address of the information processing apparatus 30 through the Wi-Fi 45 (S84).

The printing setting program 66 receives the setting list transmitted from the portable terminal 40 (S84). The processing of step S84 is an example of the receiving means and the receiving processing. Thereafter, the printing setting program 66 executes the final registration processing (S36) in the similar manner to the above-described illustrative embodiment, and ends the processing. In the meantime, in the final registration processing (S36), the printing setting program 66 transmits the setting information to each MFP 20 through the second communication I/F of the information processing apparatus 30 (S71). The processing of step S36 is an example of the second storing means, the second transmission means and the second transmission processing.

Effects of First Modified Embodiment

In the first modified embodiment, the setting registration of the MFP 20 is performed using the portable terminal 40. Accordingly, it is possible to save the time necessary for the setting registration of the MFPs 20, as compared to the configuration of the related art where the user should return to the equipment place of the information processing apparatus 30 whenever the setting registration of one group is completed. When performing the setting registration of the MFP 20, a behavior of a person other than a person who performs the setting registration does not have an influence on the success or failure of the setting registration. Accordingly, the concern about an error of the setting registration is reduced.

The input of the group name and the setting information is performed by the information processing apparatus 30 of which the screen is larger than the portable terminal 40. Accordingly, the user (administrator) can easily input the group name and the setting information.

Second Modified Embodiment

In the first modified embodiment, the example where the information processing apparatus 30 performs the setting registration of the MFP 20 by using the portable terminal 40 has been described. In a second modified embodiment, an example where the information processing apparatus 30 performs the setting registration of the MFP 20 by using the IC card 14 (FIG. 1), instead of the portable terminal 40. Meanwhile, in the below, the same configurations and processing as the illustrative embodiment and the first modified embodiment are denoted with the same reference numerals, and the descriptions thereof are omitted.

As shown in FIG. 1, the system 10 of the second modified embodiment includes the plurality of MFPs 20, the information processing apparatus 30, and the IC card 14. Meanwhile, in the second modified embodiment, the portable terminal 40 is not included in the system 10. The configuration of the information processing apparatus 30 is the same as the first modified embodiment. The system 10 is an example of the information processing system.

Figure 17:
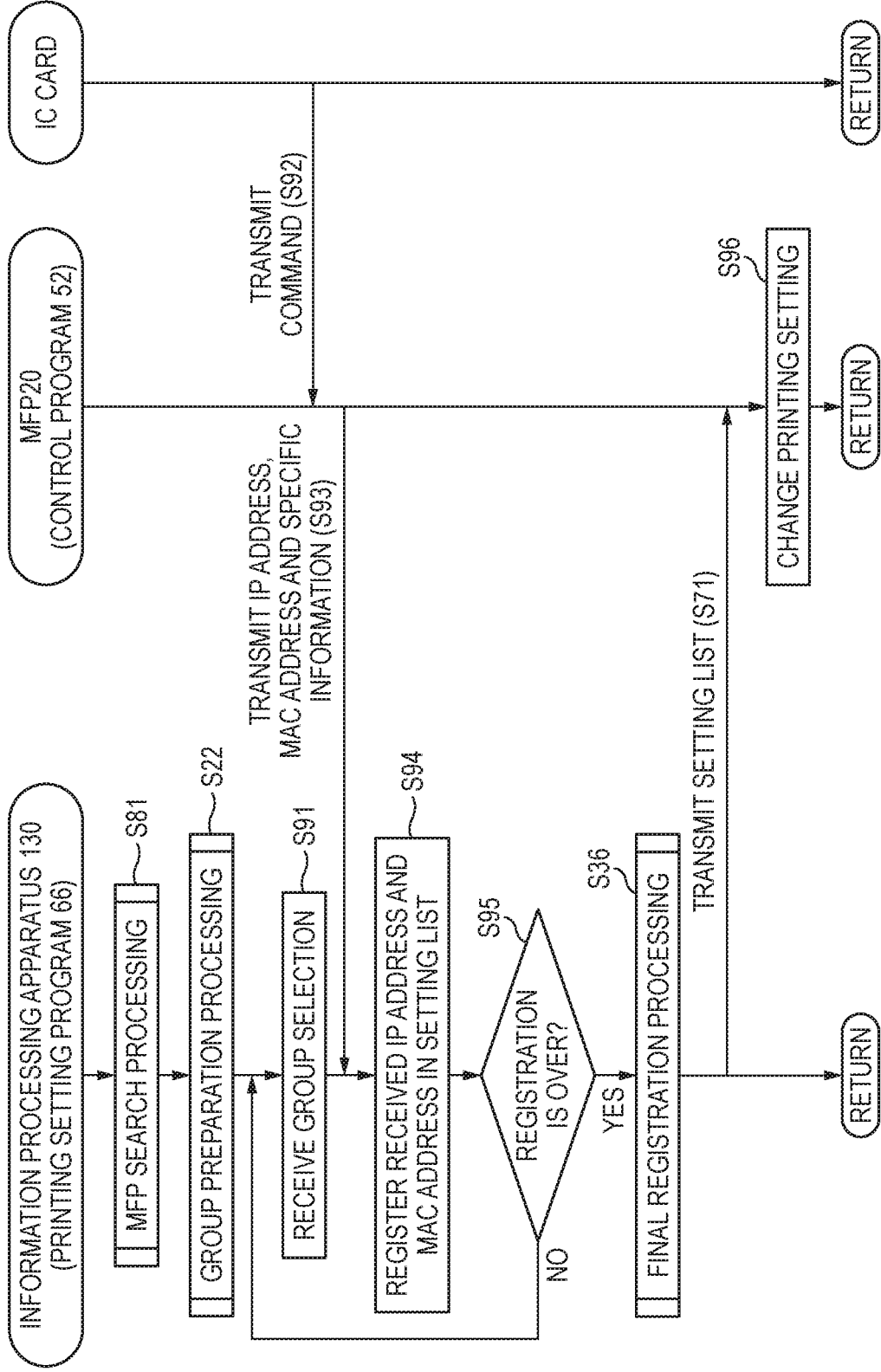
FIG. 17 depicts processing of a second modified embodiment.

The information processing apparatus 30 includes the control program 52 (FIG. 17) stored in the memory. The memory in which the control program 52 is stored and the CPU and the memory of the information processing apparatus 30 configured to execute the control program 52 are examples of the controller.

The IC card 14 includes a memory 15 and an NFC 16 configured to perform near field communication. The NFC 16 is configured to perform near field communication with the first communication I/F of the MFP 20 in a reader/writer mode. The NFC 16 is an example of the near-field interface.

In the memory 15, a command that is to be read by the MFP 20 through the near field communication is stored. The command is to instruct the MFP 20 to transmit the IP address and MAC address of the MFP 20 and specific information to the information processing apparatus 30. The specific information is information indicating that the IP address and the MAC address have been transmitted when the near field communication is performed with the IC card 14. The information processing apparatus 30 having received the IP address, the MAC address and the specific information registers the received IP address and MAC address in the setting list to complete the setting list. In the below, the details are described with reference to FIG. 17.

When the printing setting program 66 is activated by the user (administrator), the printing setting program 66 displays a screen of the same contents as the mode selection screen (FIG. 6A) on the display device (monitor). The printing setting program 66 executes the MFP search processing (S81) and the group preparation processing (S22) in the similar manner to the above-described illustrative embodiment.

In the group preparation processing (S22), the processing of acquiring the group name such as "general affairs" and the setting information is an example of the acquisition processing. The processing of associating the acquired group name and setting information and registering the same in the setting list is an example of the storing processing.

Subsequently, the printing setting program 66 receives group selection by the user (administrator) through the pull-down menu or the like, in the similar manner to the near-field standby screen shown in FIG. 10B (S91). That is, the user selects a group to be registered in advance before bringing the IC card 14 close to the MFP 20. The user selects "general affairs", for example, and brings the IC card 14 close to each MFP 20 that is to be registered in "general affairs". The information that is input as a result of the user's selection on "general affairs" is an example of the instruction information, and the processing of step S91 receiving the instruction information is an example of the reception processing.

The IC card 14 brought close to the MFP 20 performs near field communication with the MFP 20, and transmits the above-described command to the MFP 20 (S92). The MFP 20 having received the command transmits the IP address and MAC address thereof and the above-described specific information to the information processing apparatus 30 in accordance with the command (S93).

The information processing apparatus 30 receives the IP address and MAC address and the specific information transmitted from the MFP 20 (S93). The processing of step S93 receiving the device ID is an example of the receiving processing.

The information processing apparatus 30 stores the received IP address and MAC address in the setting list (FIG. 14) in association with the group ID designated in step S91 (S94). The processing of step S94 is an example of the association processing.

Subsequently, the information processing apparatus 30 determines whether an instruction indicative of registration ending has been input by the user (S95). When it is determined that the instruction indicative of registration ending has not been input (S95: No), the processing from step S91 to step S94 is repetitively executed. The determination in step S95 is performed on the basis of whether the user has selected the "end" icon, for example.

When it is determined that the instruction indicative of registration ending has been input (S95: Yes), the information processing apparatus 30 executes the final setting processing (S36), and transmits the setting information to the MFP 20 in the final setting processing (S71). The processing of step S71 is an example of the transmission processing.

In the meantime, the control program 52 of the MFP 20 receives the setting information (S71). The control program 52 of the MFP 20 having received the setting information changes the printing setting thereof in accordance with the setting information (S96).

Effects of Second Modified Embodiment

In the second modified embodiment, the setting registration of the MFP 20 is performed using the IC card. Accordingly, when performing the setting registration of the MFP 20, a behavior of a person other than a person who performs the setting registration does not have an influence on the success or failure of the setting registration. As a result, the concern about an error of the setting registration is reduced.

Third Modified Embodiment

In the above-described illustrative embodiment, the example where the MFP 20 connected to the communication network 11 is searched using the broadcast and the device information and the like are acquired from the MFP 20 connected to the communication network 11 has been described. In a third modified embodiment, an example where the printing setting program 74 acquires the device information and the like from the MFP 20 connected to the communication network 11 by using the unicast or multicast is described.

First, the printing setting program 74 of the portable terminal 40 performs communication with the information processing apparatus 30 through the Wi-Fi 45, and transmits, to the information processing apparatus 30, the request information for requesting transmission of the IP address of the MFP 20 registered in the information processing apparatus 30. When the printing setting program 74 receives a response from the information processing apparatus 30, the printing setting program 74 transmits the request information for requesting a reply of the device ID and the device information to the IP address included in the response by using the unicast or multicast. The printing setting program 74 receives a response including the device ID and the device information from the MFP 20 through the Wi-Fi 45.

Effects of Third Modified Embodiment

Since the unicast or multicast is used instead of the broadcast, it is possible to increase the reliability of the communication, as compared to the above-described illustrative embodiment. As a result, it is possible to securely acquire the device ID and the device information from the MFP 20 connected to the communication network 11.

In the meantime, when the IP address and MAC address of the MFP 20 are stored in advance in the memory 48 of the portable terminal 40, the transmission processing of the request information to the information processing apparatus 30 may be omitted.

Other Modified Embodiments

Figure 13B:
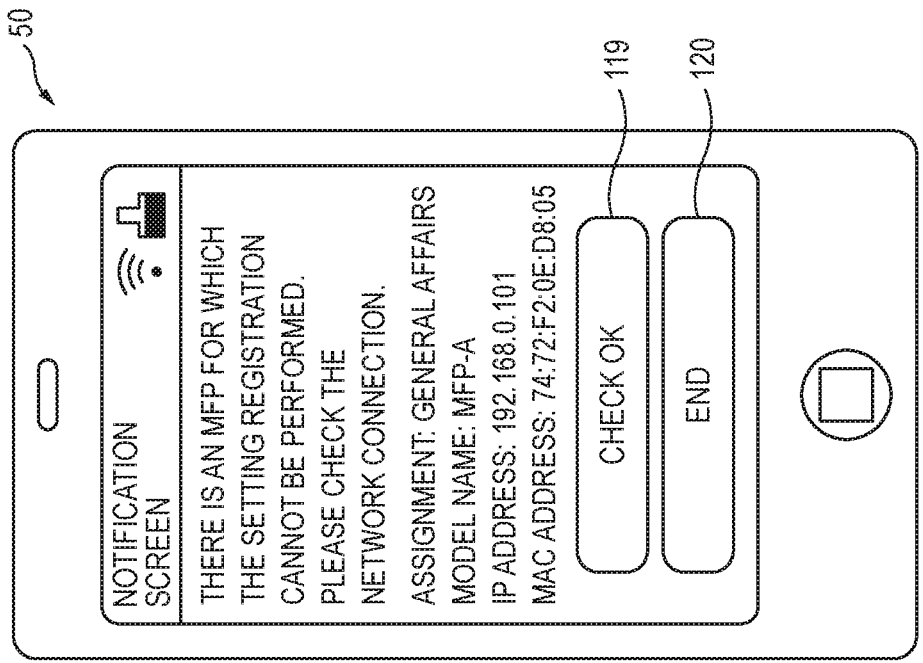
FIGS. 13A and 13B depict the notification screen.
Figure 13A:
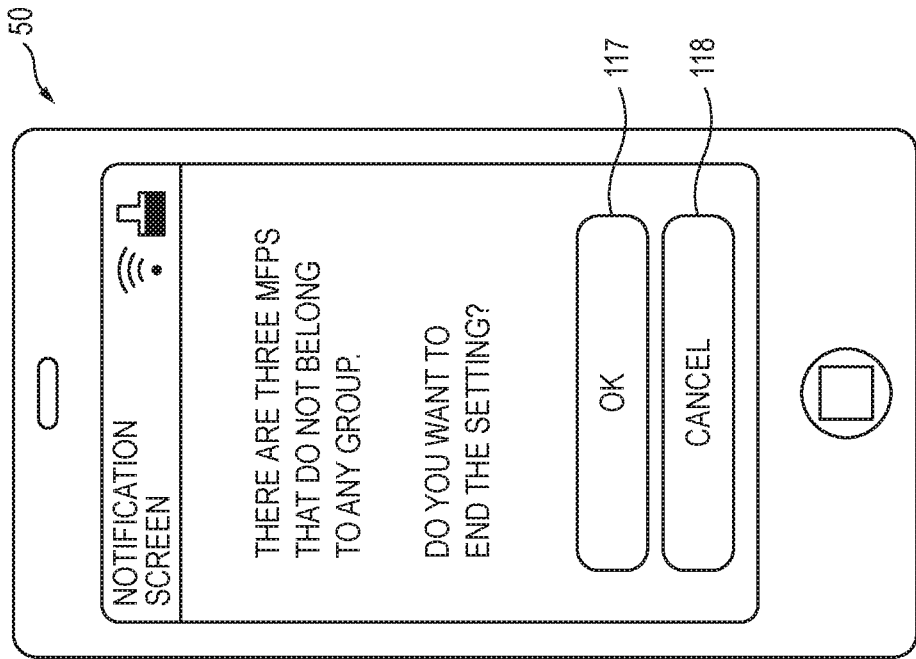

In the above-described illustrative embodiment, the example where the group information, the number of assignment-expected devices and the setting information are input to the portable terminal 40, specifically on the setting screen shown in FIGS. 13A and 13B has been described. However, the group information, the number of assignment-expected devices and the setting information may be input to the information processing apparatus 30 by using the input device. The information processing apparatus 30 is configured to transmit the input group information, number of assignment-expected devices and setting information to the IP address of the portable terminal 40. The portable terminal 40 is configured to receive the group information, number of assignment-expected devices and setting information transmitted from the information processing apparatus 30 and to store the same in the memory 48. Since the input of the group name and the setting information is made by the information processing apparatus 30 having the larger screen than the portable terminal 40, the user (administrator) can easily input the group name and the setting information. The processing in which the portable terminal 40 receives the group information, the number of assignment-expected devices and the setting information is an example of the first acquisition means.

In the above-described illustrative embodiment, the example where the MFP search processing is executed has been described. However, the MFP search processing may not be executed. However, when the MFP search processing is executed, the number of registration-expected devices is displayed on the display 41 and the first notification processing (S29), the second notification processing (S52), the fourth notification processing (S31) and the fifth notification processing (S48) are executed, so that the reliability of the setting registration is improved.

In the above-described illustrative embodiment, the NFC 46 configured to perform near field communication in the peer-to-peer mode has been described. However, the NFC 46 may be configured to perform near field communication in the reader/writer mode. After the user brings the portable terminal 40 close to the MFP 20, the user operates the MFP 20 to transmit the device ID and the device information to the portable terminal 40 through the communication network 11. The portable terminal 40 receives the device ID, the MAC address, and the device information transmitted from the MFP 20, through the Wi-Fi 45.

In the above-described illustrative embodiment, the portable terminal 40 has the NFC 46, as an example of the data acquisition interface. However, the portable terminal 40 may include a camera, instead of the NFC 46. The camera is another example of the data acquisition interface. The camera is configured to capture an image such as a QR code (registered trademark) attached to the MFP 20 and to output image data. The printing setting program 74 is configured to analyze the image data and to acquire the device ID (the IP address and the MAC address) and the device information of the MFP 20. The processing of analyzing the image data to acquire the device ID and the device information is an example of the first acquisition means.

The portable terminal 40 may include a microphone, instead of the NFC 46. The microphone is another example of the data acquisition interface. After the user brings the portable terminal 40 close to the MFP 20, the user operates the MFP 20 to output sonic waves from a speaker. The microphone of the portable terminal 40 is configured to convert the sonic waves output from the MFP 20 into sound data and to output the sound data. The printing setting program 74 is configured to analyze the sound data and to acquire the device ID and the device information of the MFP 20. The processing of analyzing the sound data to acquire the device ID and the device information is an example of the first acquisition means. In the meantime, the sonic waves that are to be output from the MFP 20 may be any waves that can be converted into the sound data by the portable terminal 40, for example, may be ultrasonic waves or sonic waves of small audible sound.

In the above-described illustrative embodiment, the example where the device ID is the IP address and the MAC address has been described. However, the device ID may be only the IP address or only the MAC address. The device ID may be other identification information such as a serial number inasmuch as it can identify each MFP 20.

In the above-described illustrative embodiment, the group name such as "general affairs" and "development" has been described as an example of the group ID. However, the group ID may be a number, a character such as an alphabet, a symbol and the like.

In the above-described illustrative embodiment, the display 41 has been described as an example of the notification unit. However, the portable terminal 40 may have a speaker, instead of the display 41 or in addition to the display 41. The speaker is configured to output, as sound, the characters and the like displayed on the notification screen shown in FIGS. 11B, 12A, 12B, 13A and 13B. The speaker is another example of the notification unit.

What is claimed is:

1. A non-transitory computer-readable recording medium storing computer-readable instructions for a portable terminal comprising a network interface, a data acquisition interface configured to acquire data from a device as the portable terminal approaches the device, and a memory, the computer-readable instructions, when executed by a processor of the portable terminal, causing the portable terminal to perform:

acquiring group ID and setting information;

storing the acquired group ID and the acquired setting information in the memory in association with each other;

executing association processing of associating the group ID stored in the memory and device ID acquired through the data acquisition interface, after receiving first instruction information and acquiring the device ID, the first instruction information being for instructing execution of the association processing for the group ID stored in the memory, the device ID being acquired from the device through the data acquisition interface, and the device ID being information for identifying the device to which the portable terminal approaches;

storing the associated information in the memory; and after executing the association processing, transmitting the setting information associated with the group ID to the device associated with the group ID, through the network interface.

2. The non-transitory computer-readable recording medium according to claim 1, wherein the portable terminal comprises a notification unit, and wherein the computer-readable instructions cause the portable terminal to perform:

transmitting request information to a plurality of devices connected to a network, through the network interface;

storing the device ID included in first response information received as a response to the request information, as a found device ID, in the memory; and controlling the notification unit to notify first notification information, in a case where it is determined that the device ID acquired through the data acquisition interface does not coincide with the found device ID.

3. The non-transitory computer-readable recording medium according to claim 1, wherein the portable terminal comprises a notification unit, and wherein the computer-readable instructions cause the portable terminal to perform:

transmitting request information to a plurality of devices connected to a network, through the network interface;

storing, in the memory, the device ID included in first response information received as a response to the request information, as a found device ID; and controlling the notification unit to notify second notification information, in a case where it is determined that the found device ID does not coincide with the device ID acquired through the data acquisition interface, the determination processing being executed in a case of receiving second instruction information, the second instruction information being for instructing execution of transmitting the setting information associated with the group ID to the device associated with the group ID through the network interface.

4. The non-transitory computer-readable recording medium according to claim 1, wherein the portable terminal comprises a notification unit, and wherein the computer-readable instructions cause the portable terminal to perform:

controlling the notification unit to notify third notification information, in a case where it is determined that the device ID does not coincide with the device ID included in second response information, within the device IDs acquired through the data acquisition interface, the second response information including the device ID and being received as a response to transmitting the setting information associated with the group ID to the device associated with the group ID through the network interface.

5. The non-transitory computer-readable recording medium according to claim 1, wherein the computer-readable instructions cause the portable terminal to perform:

transmitting the device ID, the group ID, and the setting information, that are associated with each other, to an information processing apparatus through the network interface.

6. The non-transitory computer-readable recording medium according to claim 1, wherein the computer-readable instructions cause the portable terminal to perform, in the acquiring the group ID and the setting information, at least one of:

acquiring the group ID and the setting information through an input interface of the portable terminal; and receiving the group ID and the setting information through the network interface.

7. The non-transitory computer-readable recording medium according to claim 1, wherein the portable terminal comprises an input interface and a display, wherein the processing of acquiring the group ID and the setting information includes:

controlling the display to display a first screen for receiving the group ID and the setting information through the input interface; and receiving the group ID and the setting information through the input interface in a state where the first screen is displayed, wherein the computer-readable instructions cause the portable terminal to perform:

controlling the display to display a second screen for receiving selection of the group ID; and receiving selection of the group ID through the input interface in a state where the second screen is displayed, and wherein the processing of receiving the first instruction information includes:

controlling the display to display a third screen in which the group ID received and the device ID acquired through the data acquisition interface are associated with each other;

receiving the first instruction information for instructing execution of the association processing in a state where the third screen is displayed; and executing the association processing with respect to each information received in the state where the first screen, the second screen or the third screen is displayed, and transmitting the setting information received in the state where the first screen is displayed, after receiving the first instruction information.

8. The non-transitory computer-readable recording medium according to claim 7, wherein the computer-readable instructions cause the portable terminal to perform:

further receiving an input of a number of assignment-expected devices to be associated with the group ID, through the input interface in the state where the first screen is displayed, and wherein the processing of controlling the display to display the second screen includes:
controlling the display to display the second screen for further displaying the number of assignment-expected devices; and
decrementing the number of assignment-expected devices of the group ID associated with the device ID in the association processing, in a case where the association processing is executed.

9. The non-transitory computer-readable recording medium according to claim 7, wherein the computer-readable instructions cause the portable terminal to perform:
transmitting request information to a plurality of devices connected to a network, through the network interface;
receiving first response information including the device ID, as a response to the request information;
storing, in the memory, a number of device IDs included in the received first response information, as a number of registration-expected devices;
further receiving, on the first screen, an input of a number of assignment-expected devices to be associated with the group ID, through the input interface;
decrementing the received number of assignment-expected devices from the number of registration-expected devices to calculate a number of non-setting devices; and
controlling the display to display, on the first screen, the calculated number of non-setting devices.

10. The non-transitory computer-readable recording medium according to claim 7, wherein the computer-readable instructions cause the portable terminal to perform:
transmitting request information to a plurality of devices connected to a network, through the network interface;
receiving first response information including the device ID, as a response to the request information;
storing, in the memory, a number of device IDs included in the received first response information, as a number of registration-expected devices;
decrementing the number of registration-expected devices to calculate a new number of registration-expected devices, in a case where the association processing is executed; and
controlling the display to display the number of registration-expected devices on at least one of the second screen and the third screen.

11. The non-transitory computer-readable recording medium according to claim 1,
wherein the portable terminal comprises a notification unit, and
wherein the computer-readable instructions cause the portable terminal to perform:
transmitting request information to a plurality of devices connected to a network, through the network interface;
receiving first response information including the device ID and a type of a function that the device enables to execute, as a response to the request information;
determining whether a type of function indicated by the setting information set for the group ID associated in the association processing is included in types of functions indicated by the first response information; and
controlling the notification unit to notify fourth notification information, in a case where it is determined that the type of the function indicated by the setting information set for the group ID associated in the association processing is not included in the types of the functions indicated by the first response information.

12. A non-transitory computer-readable recording medium storing computer-readable instructions for an information processing apparatus comprising a network interface and a memory, the computer-readable instructions, when executed by a processor of the information processing apparatus, causing the information processing apparatus to perform:
acquiring group ID and setting information;
storing the acquired group ID and the acquired setting information in the memory in association with each other;
transmitting the group ID to a portable terminal through the network interface, the portable terminal comprising a data acquisition interface configured to acquire device ID from a device identified with the device ID as the portable terminal approaches the device;
receiving the device ID from the portable terminal that is a transmission destination of the transmitted group ID, through the network interface;
associating the received device ID, the group ID transmitted to the portable terminal that is a transmission source of the device ID and the setting information, and storing the association in the memory; and
transmitting the setting information associated with the device ID to the device indicated by the device ID.

13. A portable terminal comprising:
a network interface;
a data acquisition interface configured to acquire data from a device as the portable terminal approaches the device;
a memory; and
a controller configured to:
acquire group ID and setting information;
store the acquired group ID and the acquired setting information in the memory in association with each other;
execute association processing of associating the group ID stored in the memory and device ID acquired through the data acquisition interface, after receiving instruction information and acquiring the device ID through the data acquisition interface, the instruction information being for instructing execution of the association processing for the group ID stored in the memory, the device ID being acquired from the device through the data acquisition interface, and the device ID being information for identifying the device to which the portable terminal approaches;
store the associated information in the memory; and
after executing the association processing, transmit the setting information associated with the group ID to the device associated with the group ID, through the network interface.

14. An information processing apparatus comprising:
a network interface;
a memory; and
a controller configured to:
acquire group ID and setting information;
store the acquired group ID and the acquired setting information in the memory in association with each other;

transmit the group ID and the setting information associated with each other to a portable terminal through the network interface;

receive the group ID, the setting information and device ID associated with each other by the portable terminal, from the portable terminal through the network interface; and transmit the setting information associated with the device ID to a device indicated by the received device ID.

15. An information processing system comprising:

an information processing apparatus including a network interface, a memory, a display and a controller; and an IC card including a near-field interface configured to perform near field communication with a device, wherein the IC card performs near field communication with the device to transmit a command for transmitting a device ID of the device to the information processing apparatus, to the device, and wherein the controller is configured to:

acquire group ID and setting information;

store the acquired group ID and the acquired setting information in the memory in association with each other;

receive instruction information for instructing execution of association processing for the group ID stored in the memory;

receive the device ID transmitted from the device receiving the command from the IC card, through the network interface;

after receiving the instruction information and receiving the device ID through the network interface, execute the association processing of associating the group ID stored in the memory and the device ID received through the network interface, and store the association in the memory; and after executing the association processing, transmit the setting information associated with the group ID to the device associated with the group ID, through the network interface.

* * * * *